（12) United States Patent
Horimai

(10) Patent No.: US 7,903,309 B2
(45) Date of Patent: Mar. 8, 2011

(54) OPTICAL INFORMATIONAL RECORDING/REPRODUCTION DEVICE AND METHOD

(75) Inventor: Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 795 days.

(21) Appl. No.: 10/556,651

(22) PCT Filed: May 13, 2004

(86) PCT No.: PCT/JP2004/006464
§ 371 (c)(1),
(2), (4) Date: Jan. 27, 2006

(87) PCT Pub. No.: WO2004/102542
PCT Pub. Date: Nov. 25, 2004

(65) Prior Publication Data
US 2008/0192311 A1    Aug. 14, 2008

(30) Foreign Application Priority Data
May 13, 2003   (JP) .................................. 2003-171394

(51) Int. Cl.
*G03H 1/10*    (2006.01)

(52) U.S. Cl. .................. 359/10; 359/11; 359/22; 359/35
(58) Field of Classification Search ............... 350/10.11, 350/22, 35
See application file for complete search history.

(56) References Cited

U.S. PATENT DOCUMENTS 5,940,514 A * 8/1999 Heanue et al. ............... 713/193
6,108,110 A * 8/2000 Orlov et al. ..................... 359/22
2003/0063342 A1 * 4/2003 Horimai ......................... 359/22

* cited by examiner

*Primary Examiner* — Audrey Y Chang
(74) *Attorney, Agent, or Firm* — DLA Piper LLP (US)

(57) ABSTRACT

An optical information recording device, a reproduction device, and a method enabling include a first spatial light modulator I for generating information light by spatially modulating light from a light source 143 by a plurality of pixels and a second spatial light modulator R for generating reference light by spatially modulating light from a light source by a plurality of pixels. The area I of the information light and the area R of the reference light on the entrance pupil surface of an objective lens 111 are formed such that one area surrounds the other area. The reference light is spatially modulated by the second spatial light modulator R such that interference is not easily generated between the reference lights in the information recording layer 3.

22 Claims, 17 Drawing Sheets

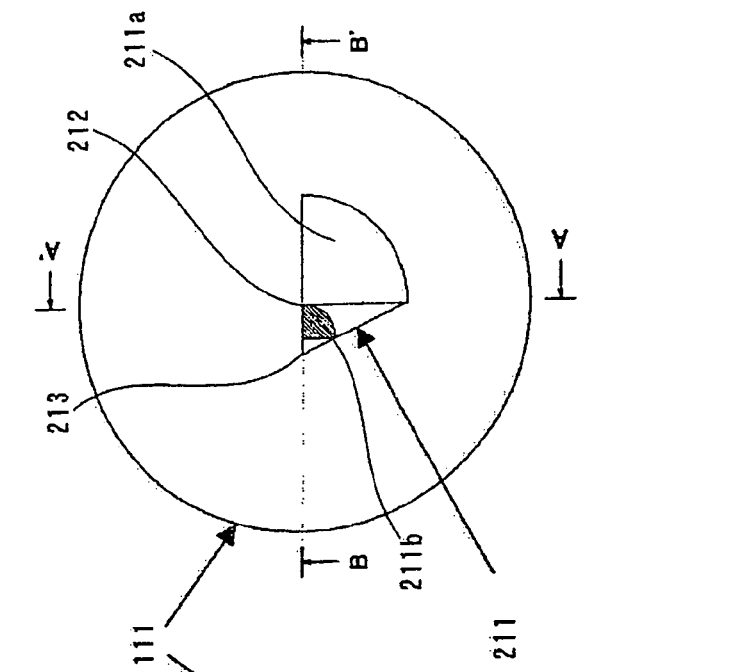
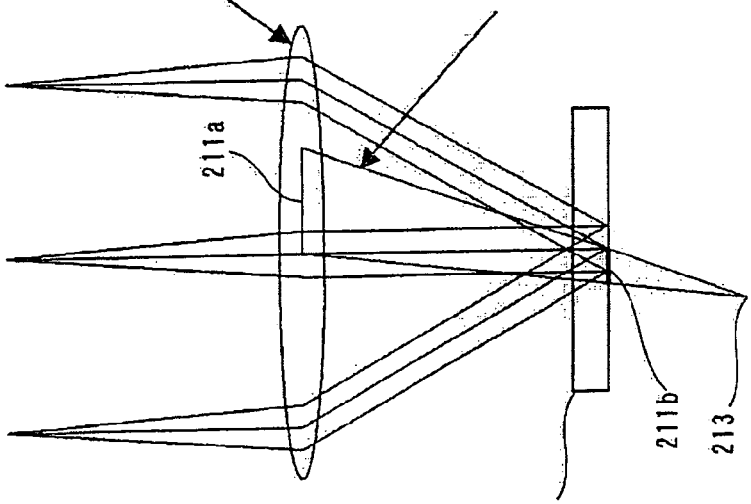
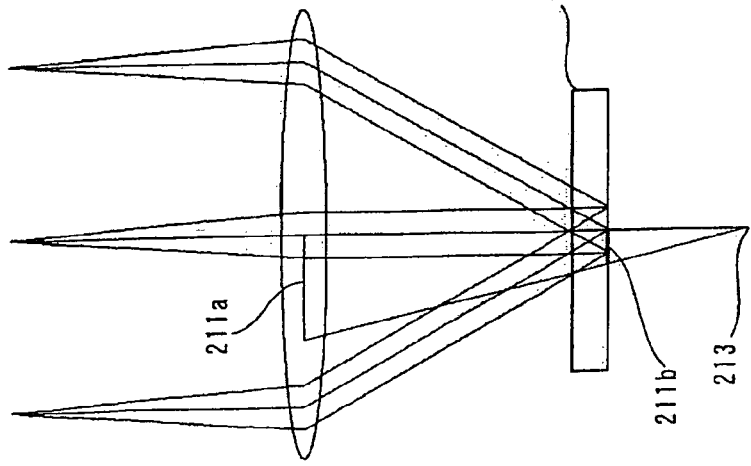

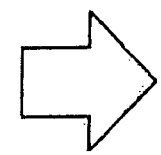 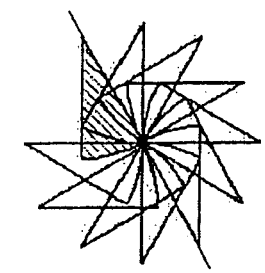
FIG. 13(e)
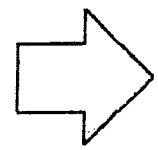 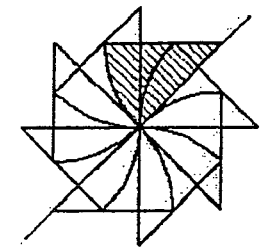
FIG. 13(d)
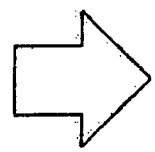 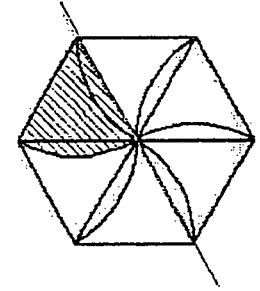
FIG. 13(c)
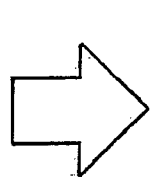 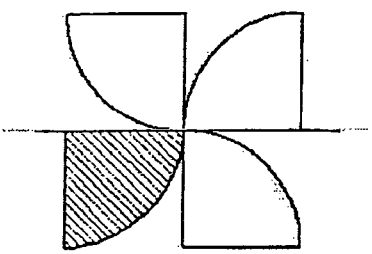
FIG. 13(b)
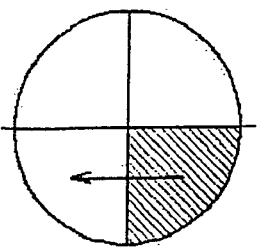  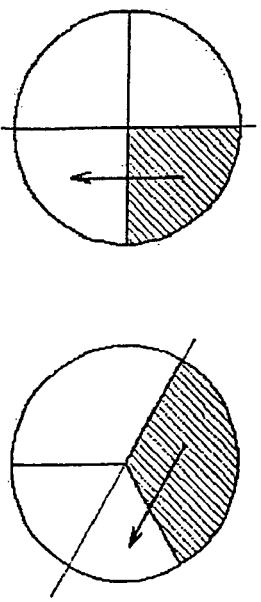 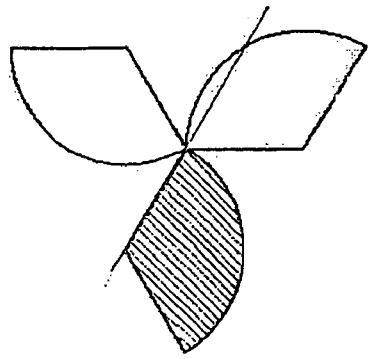
FIG. 13(a)

OPTICAL INFORMATIONAL RECORDING/REPRODUCTION DEVICE AND METHOD

BACKGROUND OF THE INVENTION

1. Field of the Invention

The present invention relates to an optical information recording device and method for generating interference on an information recording layer of a recording medium by irradiating information light holding information and reference light to the recording medium using an object lens such as to record information using these interference patterns, and an optical information reproduction device and method for making reference light interfere with interference patterns recorded on an information recording layer of a recording medium by irradiating reference light to the recording medium by an object lens such as to generate reproduction light holding information and reproduce information.

2. Description of the Related Art

Holographic recording for recording information to a recording medium, utilizing holography, is generally performed by superimposing light, holding image information, and reference light within the recording medium and writing the interference patterns formed at this time to the recording medium. And when reproducing the information recorded in the recording medium, the image information is reproduced by diffraction due to the interference patterns by irradiating the reference light to this recording medium.

In recent years, volume holography, digital volume holography in particular, has been developed on a practical level and is receiving attention for ultra-high-density optical recording. Volume holography is a system for writing interference patterns three-dimensionally, actively using the thickness direction of a recording medium as well, and can enhance diffraction efficiency by increasing thickness and increase recording capacity by using multiplex recording. In addition, digital volume holography is a computer-oriented holographic recording system which limits image information to be recorded to binarized digital patterns, while implementing the same recording media and recording system as volume holography. In this digital volume holography, graphic information such as analog illustration, for example, is temporarily digitalized and developed into binary digital pattern information which is recorded as image information. When reproducing, this image information is returned to the original graphic information and displayed by reading and decoding this information. Through this, the original information can be reproduced with extreme accuracy by performing differential detection or encoding binary data and correcting errors, even if the signal-to-noise ratio (SN ratio) is somewhat poor when reproducing.

Incidentally, a common recording device for recording information to a disk-shaped recording medium by utilizing light comprises an optical head for irradiating information recording light to the recording medium. Furthermore, this recording device records information to the recording medium by irradiating information recording light from the optical head to the recording medium, while rotating the recording medium. In addition, semiconductor laser is generally used as a light source for generating information recording light in this recording device.

As in the foregoing common recording device, successively-recording information in a plurality of information recording areas within the recording medium by irradiating information light and reference light to the recording medium, while rotating the recording medium, is possible in holographic recording, as well. In this case, it is also preferable to use a practical semiconductor laser as the light source for information light and reference light in holographic recording, as in the foregoing common recording device.

An optical system for recording/reproduction provided within a light head 40 is described below with reference to a cross-sectional view of the light head in Japan Unexamined Patent Application 2002-183975 (Patent Reference 1), shown in FIG. 16.

The light head 40 has a head body 41 which houses each of the constituents described hereafter. A semiconductor laser 43 is fixed onto the bottom of this head body 41 with a support 42 in between, and a reflective phase spatial light modulator 44 and an optical detector 45 are fixed onto the bottom of this head body 41, as well. A microlens array 46 is mounted onto the acceptance surface of the optical detector 45. In addition, the prism block 48 is provided above the phase spatial light modulator 44 and the optical detector 45, within the head body 41. A collimator lens 47 is provided in the vicinity of the end of the prism block 48 on the semiconductor laser 43-side. In addition, an opening is formed on the side of the head body 41 facing a recording medium 1, and an object lens 11 is provided at this opening. A ¼ wavelength plate 49 is provided between this object lens 11 and the prism block 48.

The phase spatial light modulator 44 has numerous pixels aligned in a lattice and can set the phase of emission light for every pixel to either one of two values which differ from each other by $\pi$ radians such as to spatially modulate the phase of the light. Furthermore, the phase spatial light modulator 44 is configured to rotate the polarizing direction of the emission light by 90° to the polarization direction of incident light. A reflective liquid crystal element, for example, can be used as the phase spatial light modulator 44.

The optical detector 45 has numerous pixels aligned in a lattice and can detect the intensity of light received by each pixel. In addition, microlens array 46 has a plurality of microlenses, each of which is placed in a position facing the acceptance surface of each pixel of the optical detector 45.

A CCD-type solid-state image sensing device and MOS-type solid-state image sensing device can be used as the optical detector 45. In addition, a smart optical sensor, wherein a MOS-type solid-state image sensing device and a signal processing circuit are integrated on one chip (for example, refer to Reference "O plus E, September 1996, No. 202, Pages 93 to 99"), can be used as the optical detector 45. This smart optical sensor has a large transfer rate and a high-speed operation function and enables high-speed reproduction, for example, enabling reproduction at a transfer rate of G (giga) bit/second order.

The prism block 48 has a polarized beam splitter surface 48a and a reflective surface 48b. The polarized beam splitter surface 48a is positioned nearer to the collimator lens 47 than the reflective surface 48b is. Both the polarized beam splitter surface 48a and the reflective surface 48b are positioned such that their normal directions have oblique angles of 45° to the optical axis direction of the collimator lens 47 and they are positioned such as to be parallel to one another.

The phase spatial light modulator 44 is positioned under the polarized beam splitter surface 48a and the optical detector 45 is positioned under the reflective surface 48b. In addition, the ¼ wavelength plate 49 and the object lens 11 are positioned over the polarized beam splitter surface 48a. Hologram lenses can be used as the collimator lens 47 and the object lens 11. The polarized beam splitter surface 48a of the prism block 48 separates the optical path for the information light, the recording reference light and the reproduction reference light before passing through the ¼ wavelength plate 49 and that for the return light from the recording medium 1 after passing through the ¼ wavelength plate 49, using the differences in their polarizing directions.

Next, the operation of the optical system for recording/reproduction at the time of recording of information is briefly described below.

A semiconductor laser emits coherent polarized light S. The polarized light S is linearly polarized light with a polarizing direction perpendicular to the entrance plane. Polarized light P, described hereafter, is linearly polarized light with a polarizing direction parallel to the entrance plane.

The laser light of the polarized light S emitted from the semiconductor laser 43 is formed into parallel light by the collimator lens 47, irradiated onto the polarized beam splitter surface 48a of the prism block 48, and is reflected by this polarized beam splitter surface 48a such as to enter the phase spatial light modulator 44.

In a conventional optical information recording/reproduction device, the information light and the recording reference light are generated by the phase spatial light modulator 44. The phase spatial light modulator 44 is configured such that a coherent parallel light with constant phase and intensity is irradiated thereto. In the phase spatial light modulator 44, when recording information, the display area is equally divided into two parts, wherein information light is generated with its phase spatially modulated in one part of the area by selecting the phase of the emission light for every pixel, depending on information to be recorded, and recording reference light is generated in the other part by equalizing or spatially modulating the phase of the emission light for every pixel.

The information light and the recording reference light emitted from the phase spatial light modulator 44, being polarized lights P, pass through the polarized beam splitter surface 48a of the prism block 48 and the ¼ wavelength plate 49 and become circular polarized lights. These information light and recording reference light are irradiated onto the recording medium 1 after being converged by the object lens 11. These information light and recording reference light pass through an information recording layer 3, are converged on the boundary surface between an air gap layer 4 and a reflective layer 5 such that the radii of these lights become minimal and are reflected by the reflective layer 5. After being reflected by the reflective layer 5, the information light and the recording reference light are diffused and pass through the information recording layer 3 again. If the output of the semiconductor laser 43 is set to high output for recording, interference patterns, generated by interference between the information light and the recording reference light, are recorded to the information recording layer 3.

The return light from the recording medium 1 is formed into parallel light by the object lens 11 and becomes the light of polarized light S after passing through the ¼ wavelength plate 49. This return light is reflected by the polarized beam splitter surface 48a of the prism block 48, further reflected by the reflective plane 48b, and enters the optical detector 45 after passing through the microlens array 46.

When recording information, during the period when the light beam from the object lens 11 passes through an address servo area 6 of the recording medium 1, the output of the semiconductor laser 43 is set to low output for reproduction. At the same time, the phase spatial light modulator 44 emits light with the same phase for every pixel, without modulating the phase. Based on the output of the optical detector 45 during this period, address servo information, such as the basic clock, the address information, the focus error signal and the tracking error information, can be obtained Next, the operation of the optical system for recording/reproduction at the time of reproducing information is described.

When reproducing information, the output of the semiconductor laser 43 is set to low output for reproduction. The laser light of polarized light S emitted from the semiconductor laser 43 is formed into parallel light by the collimator lens 47, enters the polarized beam splitter surface 48a of the prism block 48, and is reflected by this polarized beam splitter surface 48a such as to enter the phase spatial light modulator 44. The emission light from the phase spatial light modulator 44 becomes a reproduction reference light wherein its phase is equalized or spatially modulated for every pixel. In addition, the emission light from the phase spatial light modulator 44 becomes the light of polarized light P after the polarizing direction is rotated 90°.

The reproduction reference light emitted from the phase spatial light modulator 44, being polarized light P, passes through the polarized beam splitter surface 48a of the prism block 48 and the ¼ wavelength plate 49 and becomes circular polarized light. This reproduction reference light is irradiated onto the recording medium 1 after being converged by the object lens 11. This reproduction reference light passes through the information recording layer 3, is converged on the boundary surface between the air gap layer 4 and the reflective layer 5 such that the radius of this light becomes minimal and reflected by the reflective layer 5. After being reflected by the reflective layer 5, the reproduction reference light is diffused and passes through the information recording layer 3 again. The reproduction light is generated from the information recording layer 3 by the reproduction reference light.

The return light from the recording medium 1 includes the reproduction light and the reproduction reference light. This return light is formed into parallel light by the object lens 11 and becomes the light of polarized light S after passing through the ¼ wavelength plate 49. This return light is reflected by the polarized beam splitter surface 48a of the prism block 48, further reflected by the reflective plane 48b, and enters the optical detector 45 after passing through the microlens array 46. Information recorded in the recording medium 1 can be reproduced, based on the output of this optical detector 45.

When reproducing information, based on the output of the optical detector 45 during the period when the light beam from the object lens 11 passes through the address servo area 6 of the recording medium 1, address servo information, such as the basic clock, the address information, the focus error signal and the tracking error information, can be obtained.

The phase spatial light modulator 44 can be that which does not rotate the polarizing direction of the light. In this case, the polarized beam splitter surface 48a of the prism block 48 in FIG. 16 must be changed to a half-reflective surface. Alternatively, a ¼ wavelength plate can be provided between the prism block 48 and the phase spatial light modulator 44, the light of the polarized light S from the prism block 48 can be changed to circular polarized light by the ¼ wavelength plate and irradiated onto the phase spatial light modulator 44, the circular polarized light from the phase spatial light modulator 44 can be changed to the light of the polarized light P and passed through the polarized beam splitter surface 48a. In addition, the phase spatial light modulator, which is capable of setting the phase of the emission light for every pixel to either one of three or more values, is not limited to that utilizing liquid crystal elements and, for example, can be configured to enable adjustment of the position of the reflective surface for every pixel, with regards to the traveling direction of the incident light, utilizing micromirrors.

In a light information recording/reproduction device such as that shown in U.S. Pat. No. 6,108,110 (Patent Reference 2), information light is generated by a spatial light modulator which has a plurality of pixels, reference light is generated by a light diffusion device placed in the vicinity of the spatial light modulator, and interference is generated on the information recording layer of a recording medium.

SUMMARY OF THE INVENTION

However, when information recording/reproduction using conventional holographic recording was actually performed, the inventors of the present invention discovered various defects.

If the display area in the phase spatial light modulator 44 is equally divided into two parts and information light is generated in one part of the area while reference light is generated in the other part, as shown in the optical information recording/reproduction device in Patent Reference 1, the reference light is localized in the other area.

When the reference light is localized, the information light closer to the reference light area interferes with the reference light and generates interference patterns, while the interference between the information light and the reference light weakens and interference patterns cease to be generated, the farther the information light is from the reference light area. Therefore when localized reference light is used, information is recorded unevenly and the entire information cannot be recorded nor reproduced accurately. This will be described in detail hereafter, with experiment results.

Moreover, in the optical information recording/reproduction device in Patent Reference 1, the emission light from the phase spatial light modulator 44 comprises information light, the phase of which is modulated based on information to be recorded, and recording reference light which is the emission light for every pixel, the phase of which is equalized or spatially modulated. The information light and the recording reference light are each allocated one half of the effective area of the phase spatial light modulator 44, both irradiating their respective semicircular areas. This means that only half of the information is recorded, and thus, one of the issues to be solved is the smallness of the amount of information.

In addition, one of the major problems preventing holographic recording from being put into practical use is that information recording/reproduction generates a large amount of noise and has poor SN ratio (signal-to-noise ratio).

FIG. 8(A) is information reproduced from information recorded by holographic recording described in Patent Reference 2. FIG. 8(A) is an image reproduced from holography recorded by using information light which is spatially modulated by a plurality of pixels in a matrix-form and reference light which is modulated evenly by diffusion plates placed in the vicinity of the information light, such as in the optical information recording/reproduction device in Patent Reference 2.

As shown in FIG. 8(A), conventional holographic information recording/reproduction cannot reproduce information accurately because the outline of each pixel of the reproduced image is distorted.

The inventors of the present invention discovered that the recording reference light was causing noise. In other words, conventionally, the recording reference light is formed into a light beam with a predetermined divergence angle by a diffusion plate such as to become diffusion light.

FIG. 17 is a conceptual diagram showing the relationship between the information light and the recording reference light in a conventional holographic recording. The information light 81 and the recording reference light 82 (indicated by the bold line in FIG. 17) enter the object lens 83 (indicated by the straight line in FIG. 17) from above and are irradiated onto predetermined areas of the information recording layer 84. Then, the information recording layer 84 can record the interference patterns generated by interference between the information light 81 and the recording reference light 82 three-dimensionally, namely by using, not only the surface direction, but the thickness direction of the recording medium as well.

FIG. 18 is an overview showing a portion related to the cross-sectional form of a conventional recording reference light generation means for generating the recording reference light 82. In the conventional recording reference light generation means for generating the recording reference light 82, the cross-sectional form of the recording reference light 82 was determined by making the information light area an opening and placing the diffusion plate 85 only in the reference light area, or placing a shade mask 86 in contact with the diffusion plate 85.

Consequently, as shown in FIG. 17 and FIG. 18, the recording reference light 82 was diverged while reaching the object lens 83, becoming wider than the cross-sectional form determined by the shade mask 86 and the opening.

As a result, because the recording reference lights 82 was irradiated onto the object lens 83, diverged even onto portions shielded by the shade mask 86 and the opening, the recording reference lights 82 within the information recording layer 84 overlapped each other, generating interference patterns 87 (indicated by the oblique lines in FIG. 17 and FIG. 18). These interference patterns 87 generated between the recording reference lights 82 became noise in information recorded to the recording medium, preventing accurate recording.

Furthermore, when a reflective layer is provided in the recording medium as shown in Patent Reference 1, the recording reference light incident on the recording medium passed through the information recording layer of the recording medium, was reflected by the reflective layer of the recording medium, and passed through the information recording layer again. Then, interference patterns were generated by the reflected lights of the recording reference lights overlapping each other in the information recording layer 84.

In addition, information security measures for holographic recordings of large recording capacity are also one of the issues to be resolved.

The present invention has been achieved with these issues in mind, and an object of the invention is to provide an optical information recording device, a reproduction device, and a method enabling more accurate recording and reproduction of information in holographic recording and reproduction.

In addition, another object of the present invention is to provide an optical information recording/reproduction device and an optical information recording/reproduction method with large information recording capacity and low noise-generation, enabling information encryption, ensuring high security, and also capable of obtaining address servo information without fail.

In order to achieve the foregoing objects, the optical information recording device of the present invention is an optical information recording device which irradiates information light holding information and reference light onto a recording medium using an object lens, causes interference in the information recording layer of the recording medium, and records information using the resultant interference patterns, comprising: a first spatial light modulator for generating information light by spatially modulating light from a light source by a plurality of pixels; and a second spatial light modulator for generating the reference light by spatially modulating light from the light source by a plurality of pixels; wherein the information light area and the reference light area on the entrance pupil surface of the object lens are formed such that one area surrounds the other area, and the reference light is spatially modulated by the second spatial light modulator such that interference is not easily generated between the reference lights in the information recording layer.

In addition, another optical information recording device of the present invention comprises: a first spatial light modulator for generating the information light by spatially modulating light from a light source by a plurality of pixels; and a second spatial light modulator for generating the reference light by spatially modulating light from the light source by a plurality of pixels; wherein the reference light area on the entrance pupil surface of the object lens is formed such as to surround the information light area, and the reference light is spatially modulated into a plurality of radial patterns spreading radially from the information light area, in the reference light area, by the second spatial light modulator.

Furthermore, another optical information recording device of the present invention comprises: a first spatial light modulator for generating information light by spatially modulating light from a light source by a plurality of pixels; and a second spatial light modulator for generating reference light by spatially modulating the intensity of the light from the light source by a plurality of pixels; wherein the reference light area on the entrance pupil surface of the object lens is formed such as to surround the information light area.

Still further, in any one of the foregoing optical information recording devices, the first spatial light modulator and the second spatial light modulator can comprise a first display area and a second display area of a shared spatial light modulator, respectively. In addition, the spatial light modulator can comprise a plurality of pixels which can modulate the intensity of light, and the phases of emission lights can vary according to the positions of a plurality of said pixels. Furthermore, the phase distribution of the emission light in the spatial light modulator can have a cyclic pattern wherein the traveling direction of the reference light is deflected in a direction other than the optical axis direction of the optical system.

The optical information recording method of the present invention is an optical information recording method which irradiates information light holding information and reference light onto a recording medium using an object lens, causes interference in the information recording layer of the recording medium, and records information using the resultant interference patterns, wherein both information light and reference light are spatially modulated by a plurality of pixels, the information light area and the reference light area on the entrance pupil surface of the object lens are formed such that one area surrounds the other area, and the reference light is spatially modulated such that interference is not easily generated between the reference lights in the information recording layer.

Still further, another optical information recording method of the present invention is an optical information recording method, wherein both information light and reference light are spatially modulated by a plurality of pixels, the reference light area on the entrance pupil surface of the object lens is formed such as to surround the information light area, and the reference light is spatially modulated into a plurality of radial patterns spreading radially from the information light area, in the reference light area.

Still further, in the foregoing optical information recording method, the center of the information light area, the center of the reference light area, and the virtual center point of the plurality of radial patterns can be the optical axis of the optical system.

Still further, in the foregoing optical information recording method, a plurality of reference lights with differing pattern-forms can be formed by changing the virtual center angle between the plurality of radial patterns or by rotating the plurality of radial patterns with the virtual center point as the center of rotation, and multiplex recording of a plurality of interference patterns can be performed in a plurality of superimposed areas within the information recording layer using the plurality of reference lights with differing pattern-forms.

Still further, another optical information recording method of the present invention is an optical information recording method, wherein both information light and reference light are spatially modulated by a plurality of pixels, the reference light area on the entrance pupil surface of the object lens are formed such as to surrounds the information light area and, additionally, is asymmetrical to the center of the reference light area, as well.

Still further, another optical information recording method of the present invention is an optical information recording method, wherein the light intensities of both information light and reference light are spatially modulated by a plurality of pixels, and the information light area and the reference light area on the entrance pupil surface of the object lens are formed such that one area surrounds the other area.

Still further, in the foregoing optical information recording method, the information light area can be wider than that of the reference light, and the light intensity per unit area in the reference light area can be greater than that in the information light area.

Still further, in any one of the foregoing optical information recording methods, both information light and reference light can be spatially modulated by the same spatial light modulator, and the light intensity and phase of the reference light can be spatially modulated by said spatial light modulator. In addition, the traveling direction of the reference light can be deflected in a direction other than the optical axis direction of the optical system by the spatial light modulator.

The optical information reproduction device of the present invention is an optical information reproduction device for generating reproduction light holding information and reproducing the information by irradiating reference light onto a recording medium through an object lens and making the reference light interfere with the interference patterns recorded on the information recording layer of the recording medium, comprising a spatial light modulator for generating the reference light by spatially modulating light from the light source by a plurality of pixels, wherein the reference light area on the entrance pupil surface of the object lens, regarding the reference light, and the reproduction light area on this entrance pupil surface are formed such that one area surrounds the other area, and the reference light is spatially modulated by the spatial light modulator such that interference is not easily generated between the reference lights in the information recording layer.

Still further, another optical information reproduction device of the present invention comprises a spatial light modulator for generating the reference light by spatially modulating light from a light source by a plurality of pixels, wherein the reference light area on the entrance pupil surface of the object lens regarding the reference light is formed such as to surround the reproduction light area on this entrance pupil surface, and the reference light is spatially modulated into a plurality of radial patterns spreading radially from the reproduction light area, in the reference light area, by the spatial light modulator.

Still further, another optical information reproduction device of the present invention comprises a spatial light modulator for generating the reference light by spatially modulating light from the light source by a plurality of pixels, wherein the reference light area on the entrance pupil surface of the object lens regarding the reference light and the reproduction light area on this entrance pupil surface are formed such that one area surrounds the other area.

Still further, in any one of the foregoing optical information reproduction devices, the spatial light modulator can comprise a plurality of pixels which can modulate the intensity of light, and the phases of emission lights can vary according to the positions of the plurality of pixels. In addition, the phase distribution of the emission light from the spatial light modulator can have a cyclic pattern which deflects the traveling direction of the reference light in a direction other than the optical axis direction of the optical system.

The optical information reproduction method of the present invention is an optical information reproduction method for generating reproduction light holding information and reproducing the information by irradiating reference light onto a recording medium through an object lens and making the reference light interfere with the interference patterns recorded on the information recording layer of the recording medium, wherein the reference light is spatially modulated by a plurality of pixels, the reference light area on the entrance pupil surface of the object lens, regarding the reference light, and the reproduction light area on this entrance pupil surface are formed such that one area surrounds the other area, and the reference light is spatially modulated by the spatial light modulator such that interference is not easily generated between reference lights in the information recording layer.

In addition, another optical information reproduction method of the present invention is an optical information reproduction method, wherein the reference light is spatially modulated by a plurality of pixels, the reference light area on the entrance pupil surface of the object lens, regarding the reference light, is formed such as to surround the reproduction light area on this entrance pupil surface, and the reference light is spatially modulated into a plurality of radial patterns spreading radially from the reproduction light area, in the reference light area.

Furthermore, in the foregoing optical information reproduction method, the center of the reference light area, and the virtual center point of the plurality of the radial patterns can be the optical axis of the optical system.

Still further, another optical information reproduction method of the present invention is an optical information reproduction method, wherein the reference light is spatially modulated by a plurality of pixels, and the reference light area on the entrance pupil surface of the object lens, regarding the reference light, is formed such as to surround the reproduction light area on this entrance pupil surface and, additionally, is asymmetrical to the center of the reference light area.

Still further, another optical information reproduction method of the present invention is an optical information reproduction method for generating reproduction light holding information and reproducing the information by irradiating reference light onto a recording medium through an object lens and making the reference light interfere with the interference patterns recorded on the information recording layer of the recording medium, wherein the light intensity of the reference light is spatially modulated by a plurality of pixels, the reference light area on the entrance pupil surface of the object lens, regarding the reference light, and the reproduction light area on this entrance pupil surface are formed such that one area surrounds the other area.

Still further, in any one of the foregoing optical information reproduction methods, the light intensity and phase of the reference light can be spatially modulated by a spatial light modulator. In addition, the traveling direction of said reference light can be deflected in a direction other than the optical axis direction of the optical system by the spatial light modulator.

Still further, any one of the foregoing optical information recording devices can comprise a servo light source which differs from the light source for recording information to the recording medium and a servo information acquisition means for obtaining address servo information recorded to the recording medium by the light from the servo light source.

Still further, any one of the foregoing optical information reproduction devices can comprise a servo light source which differs from the light source for recording information to the recording medium and a servo information acquisition means for obtaining address servo information recorded to the recording medium by the light from the servo light source.

According to the present invention described above, an optical information recording device, a reproduction device, and a method enabling more accurate recording and reproduction of information in holographic recording and reproduction can be obtained.

In addition, an optical information recording/reproduction device and an optical information recording/reproduction method capable of providing large information recording capacity and low noise-generation, encrypting information, ensuring high security for information, and obtaining address servo information without fail can also be obtained.

Details are given in the description of the embodiments of the present invention.

BRIEF DESCRIPTION OF THE DRAWINGS

FIG. 12 is an explanatory diagram of when the traveling direction of reference light is deflected in a direction other than the optical axis direction;

FIG. 13 is an explanatory diagram of when the traveling direction of reference light is deflected in a direction other than the optical axis direction;

DESCRIPTION OF THE PREFERRED EMBODIMENTS

The embodiments of the present invention are described below by drawings.

Figure 1:
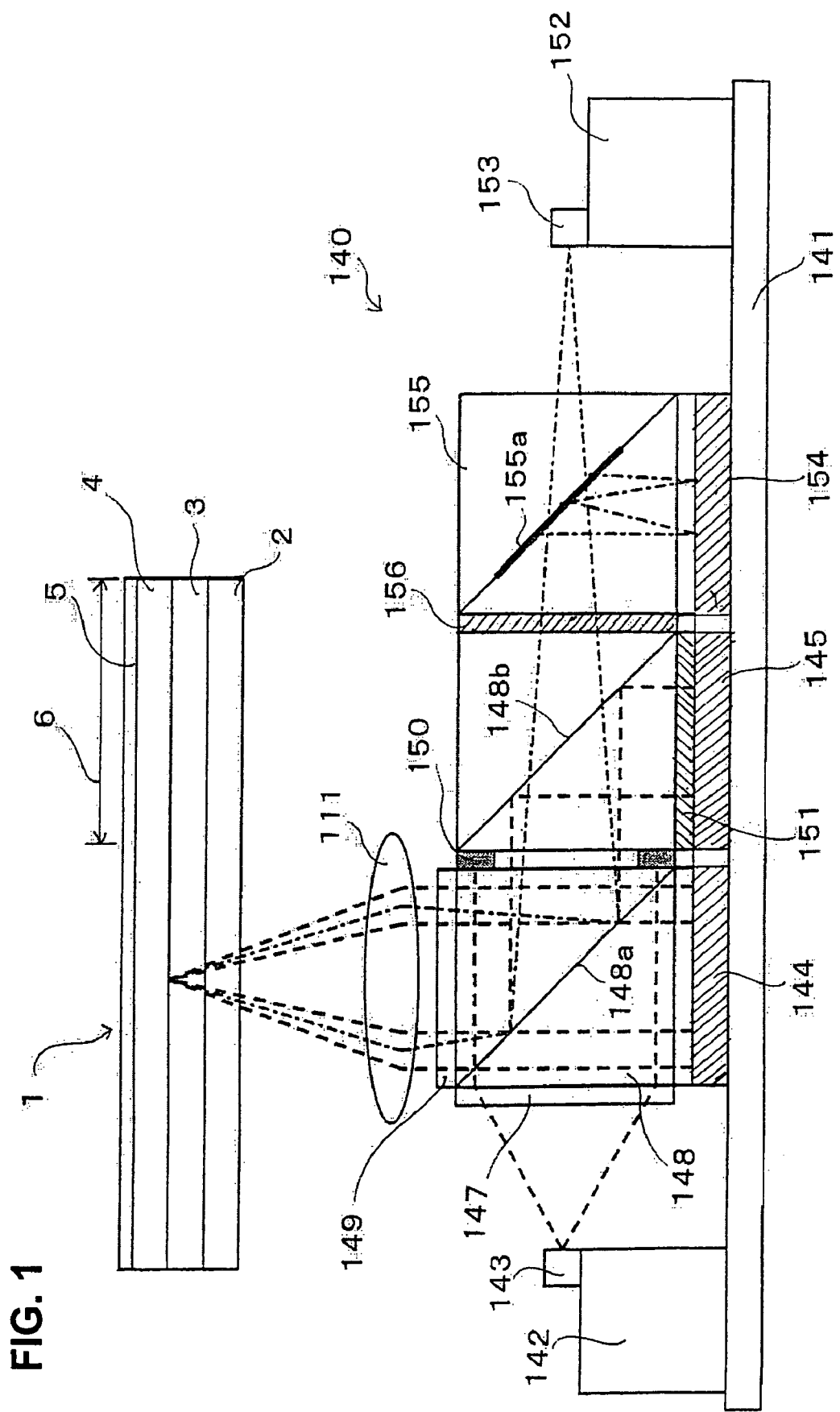
FIG. 1 is a cross-sectional view of an embodiment of the optical information recording/reproduction device of the present invention.

FIG. 1 shows an embodiment of the optical information recording/reproduction device of the present invention.

FIG. 1 shows a cross-section of a light head 140 in an embodiment of the optical information recording/reproduction device of the present invention.

This light head 40 has a head body 141 which houses each of the constituents described hereafter. A semiconductor laser 143 (a blue laser) is fixed onto the base part of this head body 141 via a support 142, and a reflective phase spatial light modulator 144 and an optical detector 145 are fixed thereto, as well. A microlens array (not illustrated) is mounted onto the acceptance surface of the optical detector 145. In addition, a prism block 148 is provided above the phase spatial light modulator 144 and the optical detector 145, inside the head body 141. A collimator lens 147 is provided in the vicinity of the end of the prism block 148, on the side of the semiconductor laser 143. Furthermore, an object lens 111 is provided on the side of the head body 141 which faces the recording medium 1. A ¼ wavelength plate 149 is provided between this object lens 111 and the prism block 148.

The phase spatial light modulator 144 has numerous pixels aligned in a lattice and is configured to enable modulation of the phase and/or intensity of the emission light for every pixel, separately. DMD (digital micromirror device) or liquid crystal element can be used as the phase spatial light modulator 144. DMD can spatially modulate intensity by modulating the reflection direction of the incident light for every pixel and spatially modulate phase by modulating the reflection position of the incident light for every pixel. Liquid crystal elements can spatially modulate the intensity and phase of incident light by controlling the orientation state of the liquid crystals for every pixel.

For example, the phase of light can be spatially modulated by setting the phase of the emission light for every pixel to either one of two values which differ from each other by π radians, and light intensity can be spatially modulated by controlling the on and off of the emission light for every pixel. The spatial light modulator 144 is configured to rotate the polarization direction of the emission light by 90° to the polarization direction of the incident light. Although only a reflective-type spatial light modulator can be used as the spatial light modulator in the light head 140 shown in FIG. 1, a transmitting-type can be placed in the middle of the optical path.

The spatial light modulator 144 can generate information light and reference light through spatially modulating the light from the light source 143 by a plurality of pixels. Although, in FIG. 1, the information light and the reference light are generated by a shared spatial light modulator, a spatial light modulator which generates information light and a spatial light modulator which generates reference light by dividing the light from the light source 143 can be provided separately. If information light and reference light are generated by a shared spatial light modulator 144, as shown in FIG. 1, a first display area and a second display area can be set within the spatial light modulator, and each area can generate either the information light or the reference light.

Figure 2:
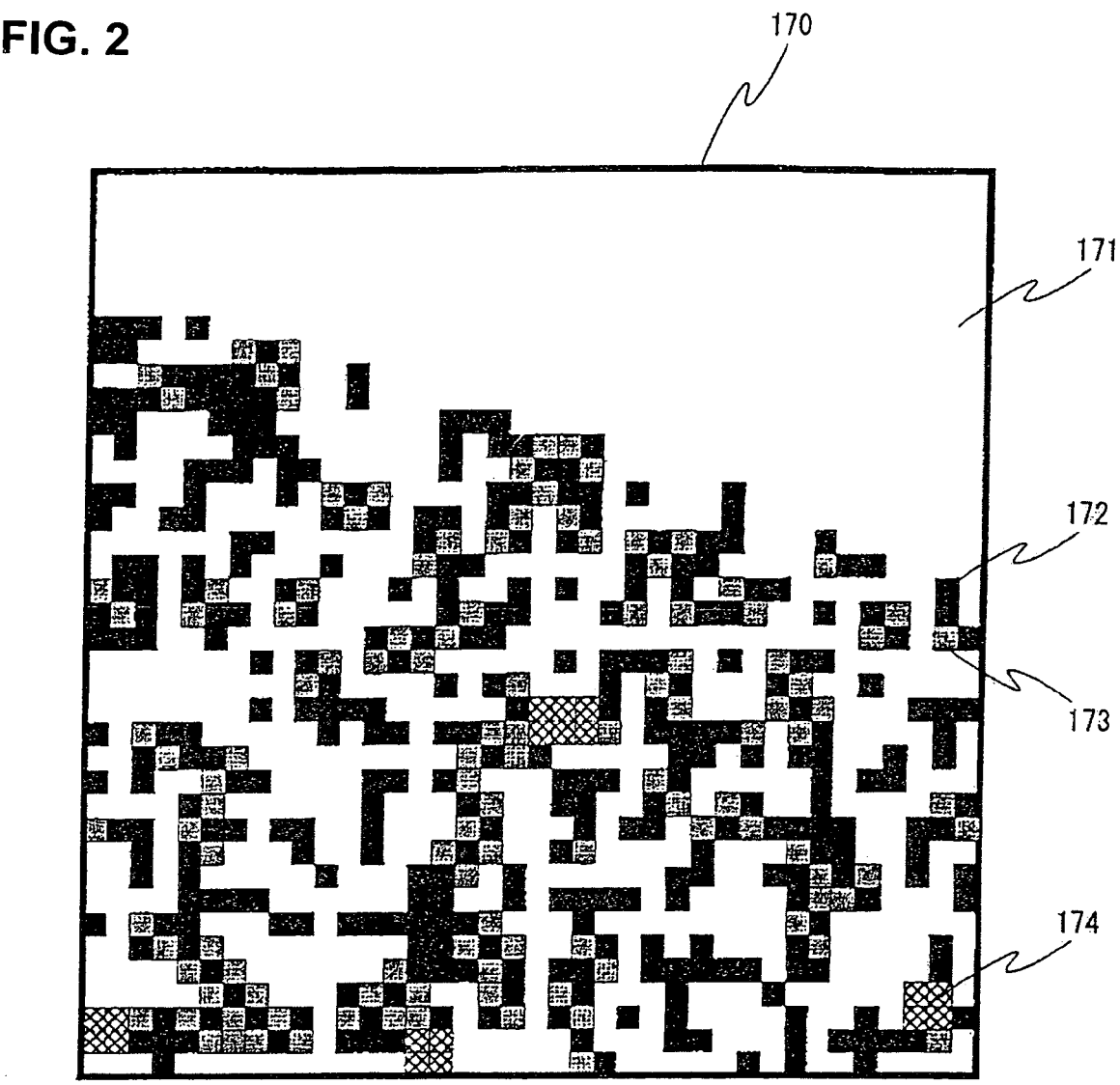
FIG. 2 is a top view showing the phase distribution of emission light emitted from the spatial light modulator.

In addition, the spatial light modulator which spatially modulates the light intensities by a plurality of pixels can vary the phases of the emission lights according to the positions of the pixels. FIG. 2 shows the phase distribution of the emission light emitted from a spatial light modulator 170. In FIG. 2, the phases of modulated emission lights are represented by patterns. The emission light with the first phase is formed in the area 171 of the spatial light modulator 170, the emission light with the second phase is formed in the area 172, the emission light with the third phase is formed in the area 173, and the emission light with the fourth phase is formed in the area 174. Phase distribution can be random or have a cyclic pattern.

When the light intensities are spatially modulated by a plurality of pixels in this spatial light modulator 170, the phases and intensities of information light or reference light are also spatially modulated because the phases also change according to the positions of modulated pixels. Such configuration can be achieved by providing the spatial light modulator with films or optical elements having phase distributions.

Generally, the modulation rate of a spatial light modulator which spatially modulates the phase of light was low, and it took time to switch modulation patterns. However, in a spatial light modulator which spatially modulates the light intensity by a plurality of pixels, emission lights with differing phases can be easily obtained by varying the phases of emission lights according to the positions of the pixels. In addition, because the phases and intensities of reference light differ, the variations in the spatial modulation patterns of the reference light are increased, and recorded information of a higher density and with multi-levels can be realized.

The optical detector 145 has numerous pixels aligned in a lattice and can detect the intensity of light received by each pixel. In addition, in order to converge reproduction light to each pixel, a microlens array which has a plurality of microlenses, each of which is placed in a position facing the acceptance surface of each pixel of the optical detector 145 (not illustrated), can be mounted.

A CCD-type solid-state image sensing device and MOS-type solid-state image sensing device can be used as the optical detector 145. In addition, a smart optical sensor, wherein a MOS-type solid-state image sensing device and a signal processing circuit are integrated on one chip (for example, refer to Reference "O plus E, September 1996, No. 202, Pages 93 to 99"), can be used as the optical detector 145. This smart optical sensor has a large transfer rate and a high-speed calculation function and enables high-speed reproduction, for example, enabling reproduction at a transfer rate of G (giga) bit/second order.

The prism block 148 has a polarized beam splitter surface 148a and a reflective surface 148b. The polarized beam splitter surface 148a is positioned closer to the collimator lens 147 than the reflective surface 148b. The polarized beam splitter surface 148a and the reflective surface 148b are both positioned such that their normal directions are angled at 45° to the optical axis direction of the collimator lens 147 and are positioned such as to be parallel to one another, A ring mask is provided therebetween to shield the reproduction reference light in the reproduction light.

The phase spatial light modulator 144 is positioned below the polarized beam splitter surface 148a and the optical detector 145 is positioned below the reflective surface 148b. Furthermore, the ¼ wavelength plate 149 and the object lens 111 are positioned above the polarized beam splitter surface 148a. A wavelength filter 151 for shielding light with a wavelength other than the wavelength of the light emitted from the semiconductor laser 143 (light emitted from semiconductor laser 153, described hereafter, in the present embodiment) is placed between the polarized beam splitter surface 148a and the optical detector 145. A hologram lens can be used as the collimator lens 147 and the object lens 111. The polarized beam splitter surface 148a of the prism block 148 can separate the optical path for information light, recording reference light and reproduction reference light prior to passing through the ¼ wavelength plate 149 and the optical path for the return light from the recording medium 1 after passing through the ¼ wavelength plate 49, using the differences in polarizing direction.

A semiconductor laser 153 (a red laser), a light source for generating servo light, differs from the semiconductor laser 143 for recording information in the recording medium 1, onto the base part of the head body 141 on the left side of FIG. 1. This semiconductor laser 153 is fixed on the same optical axis, via a support 153, opposing the semiconductor laser 143 and, additionally, a servo information acquisition means 154 for obtaining address servo information recorded in a servo area 6 of the recording medium 1 using the light from a servo light source is also fixed onto the base part of the head body 141. A prism block 155 is provided above this servo information acquisition means 154. A polarized beam splitter surface 155a of the prism block 115 is positioned parallel to the reflective surface 148b of another prism block 148, and a wavelength filter 156 for shielding light with a wavelength other than the wavelength of the light emitted from the semiconductor laser 153 (light emitted from the semiconductor laser 143 in the present embodiment) is placed between the polarized beam splitter surface 155a and the reflective surface 148b.

Next, the basic operations of the recording optical system, when the optical information recording/reproduction device in the present embodiment records information, are described.

The semiconductor laser 143 emits coherent polarized light S (indicated in FIG. 1 by the broken line). Polarized light S is a linearly polarized light with a polarizing direction perpendicular to the entrance plane. Polarized light P, described hereafter, is a linearly polarized light with a polarizing direction parallel to the entrance plane.

The laser light of polarized light S emitted from the semiconductor laser 143 is formed into parallel light by the collimator lens 147, enters the polarized beam splitter surface 148a of the prism block 148, is reflected by this polarized beam splitter surface 148a, and enters the spatial light modulator 144.

Then, information light and recording reference light which have been spatially modulated by a plurality of pixels of the spatial light modulator 144 are emitted. In addition, information light and recording reference light become the light of polarized light P after polarizing directions thereof are rotated 90° by the spatial light modulator 144.

The information light and the recording reference light emitted from the phase spatial light modulator 144, being polarized lights P, are changed to circular polarized lights after passing through the polarized beam splitter surface 148a of the prism block 148 and passing through the ¼ wavelength plate 149. These information light and recording reference light are irradiated onto the recording medium 1 after being converged by the object lens 111. These information light and recording reference light pass through a information recording layer 3, are converged on the boundary surface between an air gap layer 4 and a reflection coating 5 such that the radii of these lights become minimal and are reflected by the reflective coating 5. After being reflected by the reflective coating 5, the information light and the recording reference light are diffused and pass through the information recording layer 3 again.

If the output of the semiconductor laser 143 is set to an output for recording, the interference patterns, generated by interference between the information light and the recording reference light, are recorded on the information recording layer 3.

The return light from the recording medium 1 is formed into parallel light by the object lens 111 and becomes the light of polarized light S after passing through the ¼ wavelength plate 149. This return light is reflected by the polarized beam splitter surface 148a of the prism block 148, further reflected by the reflective plane 148b, and enters the optical detector 145 after passing through the microlens array.

When recording and reproducing information, the red light beam (indicated by the dashed line in FIG. 1) emitted from the semiconductor laser 153, another servo light source, passes through the polarized beam splitter surface 155a of the prism block 155, is reflected by the polarized beam splitter surface 148a of the prism block 148, passes through the ¼ wavelength plate 149, is formed into parallel light by the object lens 111 and irradiated onto the recording medium 1. Then the return light from the recording medium 1 is formed into parallel light by the object lens 111, passes through the ¼ wavelength plate 149, is reflected by the polarized beam splitter surface 148a of the prism block 148, further reflected by a reflective plate 155a, and enters the servo information acquisition means 154. Although the return light is also reflected to the optical detector 145 by the reflective plane 148b of the prism block 148 at this time, it is prevented from entering the optical detector 145 by the wavelength filter 151. During the period when this red light beam passes through the address servo area 6 of the recording medium 1, the address servo information, such as the basic clock, the address information, the focus error signal and the tracking error information, can be obtained based on the output of the servo information acquisition means 154.

In addition, the light from the servo light source can be passed through the reflective plane 148b of the prism block 148 by providing wavelength selection.

Furthermore, the basic operations of the reproduction optical system, when the optical information recording/reproduction device in the present embodiment reproduces information, are described.

When reproducing information, the output of the semiconductor laser 143 is set to an output for reproduction. The laser light of polarized light S emitted from the semiconductor laser 143 is formed into parallel light by the collimator lens 47, enters the polarized beam splitter surface 48a of the prism block 48, is reflected by this polarized beam splitter surface 48a, and enters the phase spatial light modulator 144. Reproduction reference light which has been spatially modulated by a plurality of pixels in the spatial light modulator 144 is emitted. In addition, the reproduction reference light becomes the light of polarized light P after the polarizing direction thereof is rotated 90° by the spatial light modulator 144.

The reproduction reference light emitted from the spatial light modulator 144, being polarized light P, is changed to circular polarized light after passing through the polarized beam splitter surface 148a of the prism block 148 and passing through the ¼ wavelength plate 149. This reproduction reference light is irradiated onto the recording medium 1 after being converged by the object lens 11. This reproduction reference light passes through the information recording layer 3, is converged on the boundary surface between the air gap layer 4 and the reflective coating 5 such that the radius thereof becomes minimal and is reflected by the reflective coating 5. After being reflected by the reflective coating 5, the reproduction reference light is diffused and passes through the information recording layer 3 again. Reproduction light is generated from the information recording layer 3 by the reproduction reference light.

The return light from the recording medium 1 includes the reproduction light and the reproduction reference light. This return light is formed into parallel light by the object lens 111 and becomes the light of polarized light S after passing through the ¼ wavelength plate 49. This return light is reflected by the polarized beam splitter surface 148a of the prism block 148, the reproduction reference light part thereof is filtered out by a ring mask 150, is subsequently reflected by the reflective plane 148b, and enters the optical detector 145 after passing through the microlens array. Information recorded in the recording medium 1 can be reproduced based on the output of this optical detector 145.

When reproducing information, when the red light beam (indicated by the dashed line in FIG. 1) emitted from the semiconductor laser 153, a servo light source, returns from the object lens 111, the address servo information, such as the basic clock, the address information, the focus error signal and the tracking error information, can be obtained based on the output of the servo information acquisition means 154, during the period when the red light beam passes through the address servo area 6 of the recording medium 1.

The spatial light modulator 144 can be that which does not rotate the polarizing direction of light. In this case, the polarized beam splitter surface 148a of the prism block 148 in FIG. 1 must be changed to a half-reflective surface. Alternatively, a ¼ wavelength plate can be provided between the prism block 148 and the phase spatial light modulator 144, the light of the polarized light S from the prism block 148 can be changed to circular polarized light by the ¼ wavelength plate and irradiated onto the phase spatial light modulator 144, the circular polarized light from the phase spatial light modulator 144 can be changed to the light of the polarized light P and passed through the polarized beam splitter surface 148a.

This reproduction optical system has a compact structure and can obtain address servo information without fail because the semiconductor laser 153, a servo light source differing from the semiconductor laser 143 which is the light source for recording information to the recording medium, and the servo information acquisition means 154 for obtaining information recorded to the recording medium 1 using the light from the servo light source are formed as such.

Next, spatial modulation patterns of information light and reference light by the spatial light modulator are described in detail below.

Figure 3:
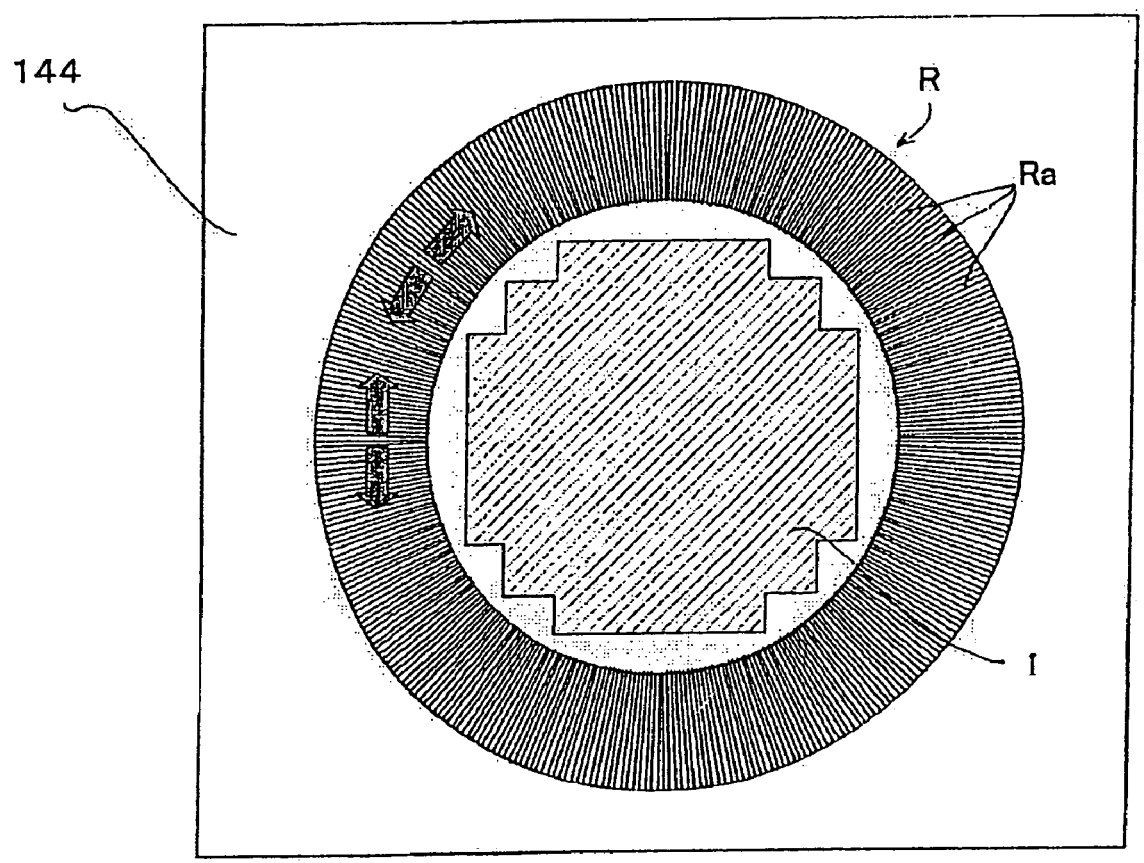
FIG. 3 is a top view showing the spatial modulation patterns of information light and reference light.
Figure 4B:
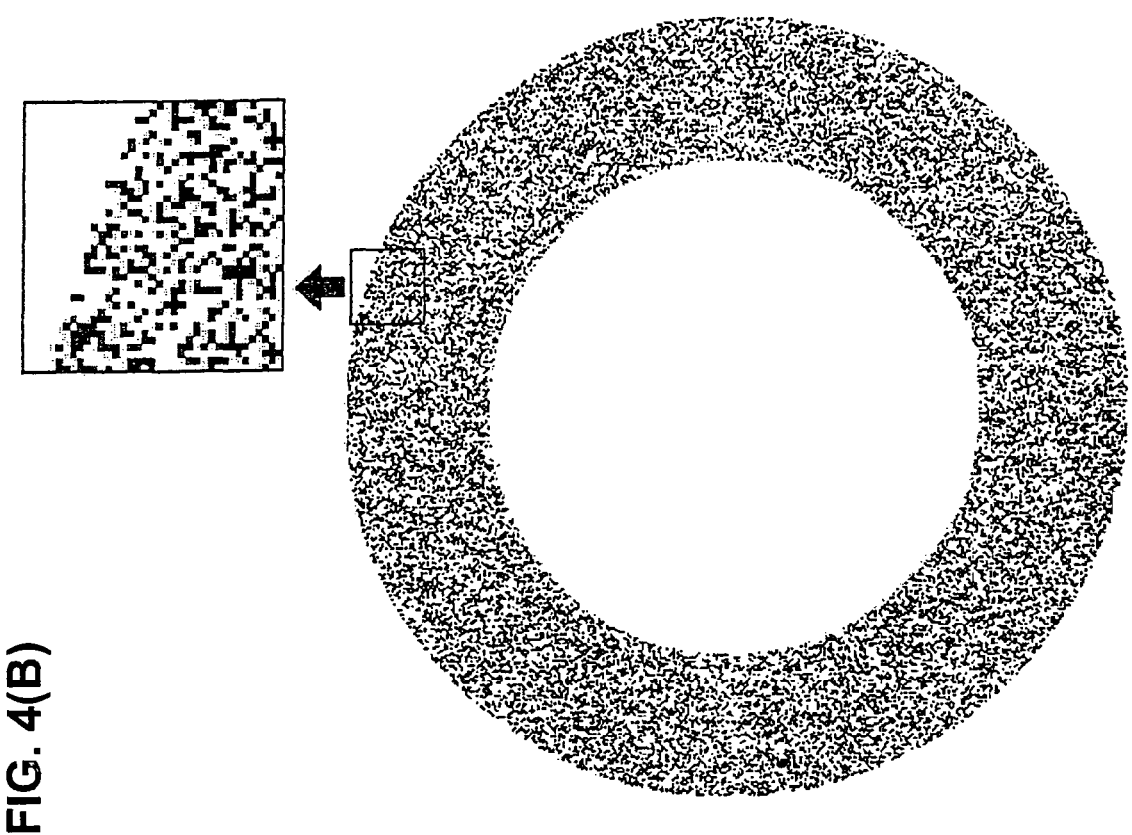
FIG. 4(a) is an explanatory diagram showing the spatial modulation patterns of information light and reference light at the time of recording and (b) is an explanatory diagram showing the spatial modulation pattern of reference light at the time of reproduction.
Figure 4A:
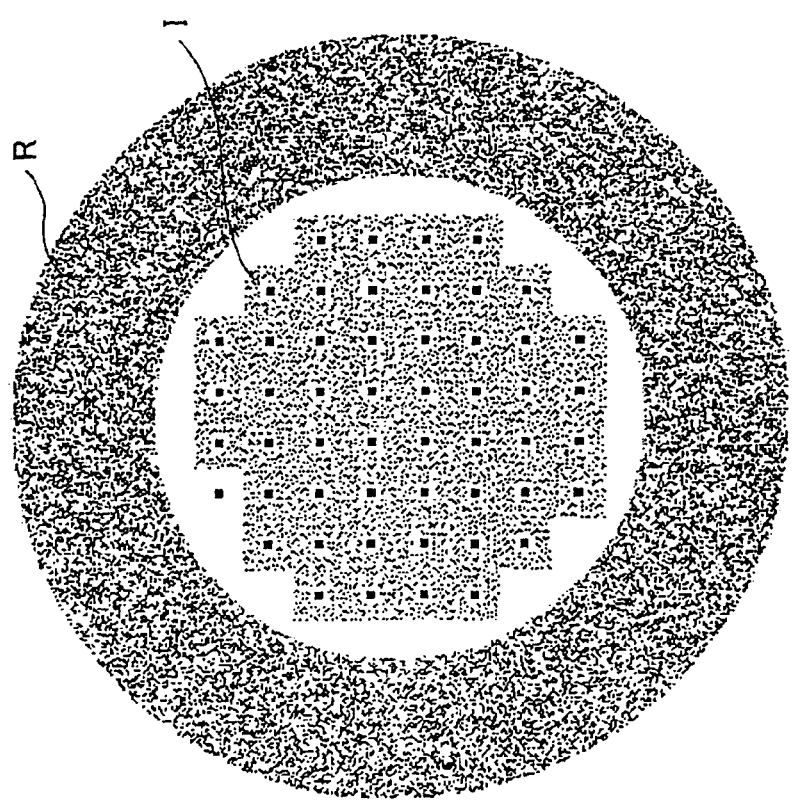

FIG. 3 and FIG. 4(a) are diagrams showing the spatial modulation patterns of the information light and the reference light on the entrance pupil surface of the object lens 111. FIG. 4(b) is a diagram showing the spatial modulation pattern of the reference light. The entrance pupil surface of the object lens 111 is the surface on which image formation of the information light and the reference light modulated by the spatial light modulator is performed. In the light head 140 in FIG. 1, the position of the spatial light modulator 144 is the entrance pupil surface of the object lens 111, and the first display area and the second display area of the spatial light modulator 144 are the information light area and the reference light area, respectively.

On the entrance pupil surface of the object lens 111, the spatial modulation pattern consists of two areas, I and R, namely the area I at the center of the entrance pupil surface and the area R which surrounds the area I, as shown in FIG. 3 and FIG. 4(a).

The shape of the central area I is not restricted to the shape shown in FIG. 3 and FIG. 4 and can be various shapes, such as circular, polygonal, or elliptical. Furthermore, the central area I can be divided into a number of smaller areas.

The shape of the area R which surrounds the area I is not restricted to the circular ring-shape shown in FIG. 3 and FIG. 4 and can be various shapes, such as a polygonal ring-shape or a combination of a polygonal ring-shape and a circular ring-shape. Furthermore, the area R does not have to be a continuous ring shape connecting the entire area, but can be divided into a number of smaller areas (refer to FIG. 5).

In a holographic recording wherein the interference patterns are formed using two spatially modulated lights, as in the present invention, either of the two spatially modulated lights can be information light or reference light. In other words, if the light in the area I is irradiated onto the interference patterns, recorded by the two spatially modulated lights in the areas I and R, as the reproduction reference light, the light in the area R is generated as reproduction light, whereas if the light in the area R is irradiated as reproduction reference light, the light in the area I is generated as reproduction light.

Therefore, of the two areas, I and R, one is the information light area and the other is the reference light area, and the information light area and the reference light area are formed such that one area surrounds the other area.

It is more preferable to use the central area I as the information light area and the area R surrounding the area I as the reference light area. Because the central part of the object lens 111 has less astigmatism and higher optical quality than the peripheral part, information can be recorded more accurately when the information light holding information is placed at the central part.

The following effects can be attained by forming the information light area and the reference light area such that one area surrounds the other area.

Figure 5A:
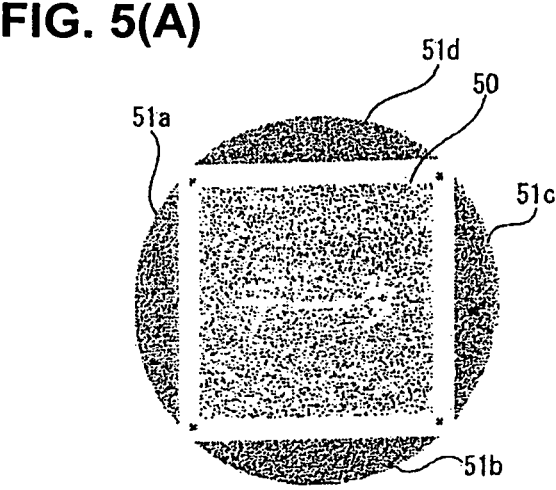
FIG. 5 explains the effects of localization of reference light.

FIG. 5(A) is a diagram showing the patterns of the information light and the reference light at the time of recording. In FIG. 5(A), a quadrangle-shaped information light area 50 is positioned at the center, and four reference light areas 51a, 51b, 51c, and 51d are positioned such as to surrounds the area 50 from four directions. The intensities of the information light and the reference light shown in FIG. 5(A) are spatially modulated by a plurality of pixels in the spatial light modulator. The interference patterns are recorded by making the information light and the reference light, shown in FIG. 5(A) interfere with each other.

Figure 5B:
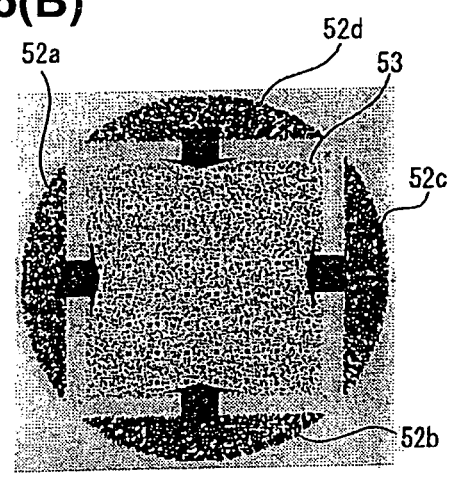
Figure 5C:
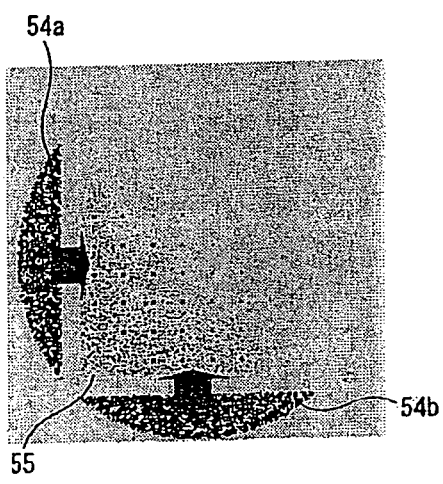
Figure 5D:
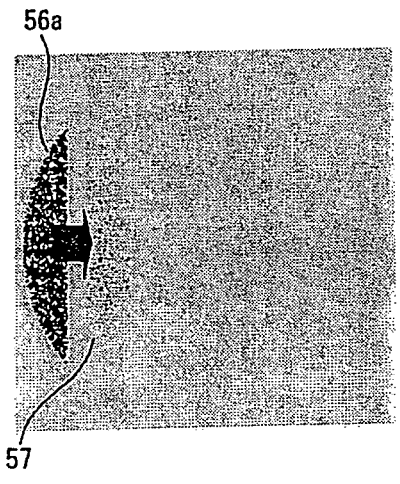

FIG. 5(B) to FIG. 5(D) show the reproduction lights detected by the optical detector. These reproduction lights are generated when reproduction reference lights of varying patterns are irradiated onto the information recording layer to which information is recorded by interfering the information light and the reference light, shown in FIG. 5(A). Although this reproduction optical system is originally configured such that the reproduction reference light is prevented from entering the optical detector by a shutter, the reproduction reference light is detected by the optical detector without being filtered out by the shutter in FIG. 5(B) to FIG. 5(D), in order to clarify the irradiated reference light area.

When the four areas 52a, 52b, 52c, and 52d are used as the reproduction reference light as when recording, the reproduction light area 53 is quadrangle-shaped, as is the information light 50 area, and the reproduction light, the intensity of which is spatially modulated by a plurality of pixels within the area 53, is detected.

As shown in FIG. 5(C), when reproduction is performed using two areas 54a and 54b as the reproduction reference light, the reproduction light area 55 is a rough triangle, composed of the left side, the bottom side and the diagonal line of the quadrangle. In addition, as shown in FIG. 5(D), when reproduction is performed using the area 56a as the reproduction reference light, only the small area near the left side of the quadrangle in the reproduction light area 57 is reproduced.

From the foregoing results, it is clear that, when reproduction reference light is localized, interference is generated in the vicinity of the irradiated reproduction reference light area and reproduction is performed, but the reproduction intensity is reduced the farther away from the reproduction reference light area it is, until reproduction ceases to be performed. These results indicate that the reference light of the area 51a strongly interferes with the information light in the vicinity of the area 51a and forms interference patterns, but interferes little with information light located far from the area 51a and does not form interference patterns.

Therefore, if the information light area and the reference light area are formed such that either area surrounds the other area, information can be recorded evenly throughout the entire information light area.

In addition, if the information light area and the reference light area are formed such that either area surrounds the other area, the information light area can be formed with a larger area than the reference light area.

Figure 6B:
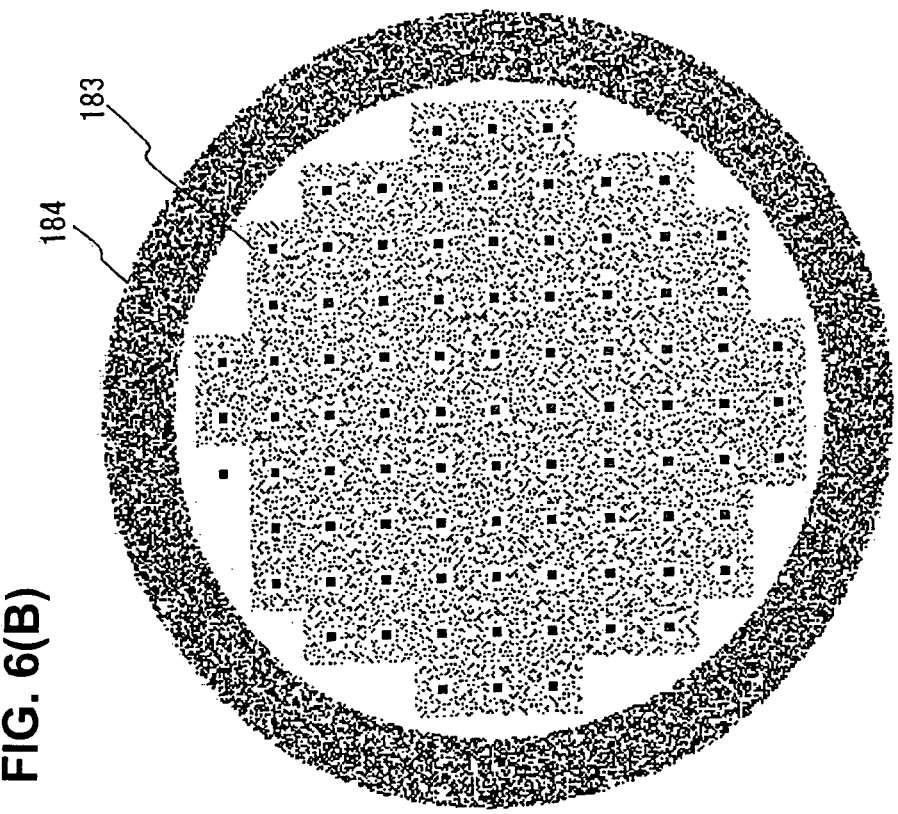
FIGS. 6(A) and (B) are top views showing the spatial modulation patterns of information light and reference light.
Figure 6A:
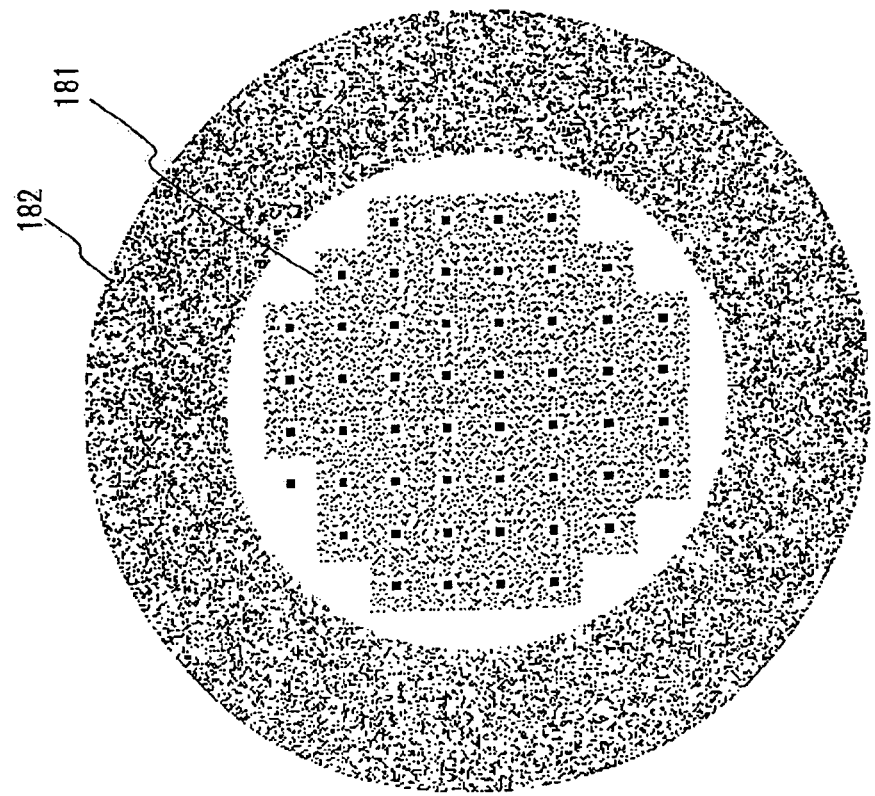

FIGS. 6(A) and 6(B) are top views showing a spatial modulation patterns of the information light and the reference light on the entrance pupil surface of the object lens. In FIGS. 6(A) and 6(B), information light areas 181 and 183 are placed in the center, around which ring-shaped reference light areas 182 and 184 are placed, respectively. Because the outer edge of the reference light area is limited, such as by the size of the object lens, the ring-shaped reference light area 184 in FIG. 6(B) is smaller than that in FIG. 6(A) because the information light area 183 is made larger. If the reference light intensity per unit area is the same in FIG. 6(A) and FIG. 6(B), the sum of the reference light intensity in FIG. 6(B) becomes smaller and may lead to insufficient interference between the information light and the reference light. Therefore, if the information light area is made larger than the reference light area, it is preferable that the light intensity per unit area in the reference light area is made larger than that in the information light area such as to increase the sum of the reference light intensity.

In order to increase the light intensity per unit area in the reference light area from that in the information light area, the light intensity of the laser for the reference light can be increased, or the modulation patterns in the spatial light modulator can be modified such that the density of the pixels which turn on the emission lights in the reference light area becomes larger than that in the information light area.

According to the present invention, the information light irradiated from a wide information light pattern display area can increase the information recording capacity, compared to conventional devices and methods.

Figure 17:
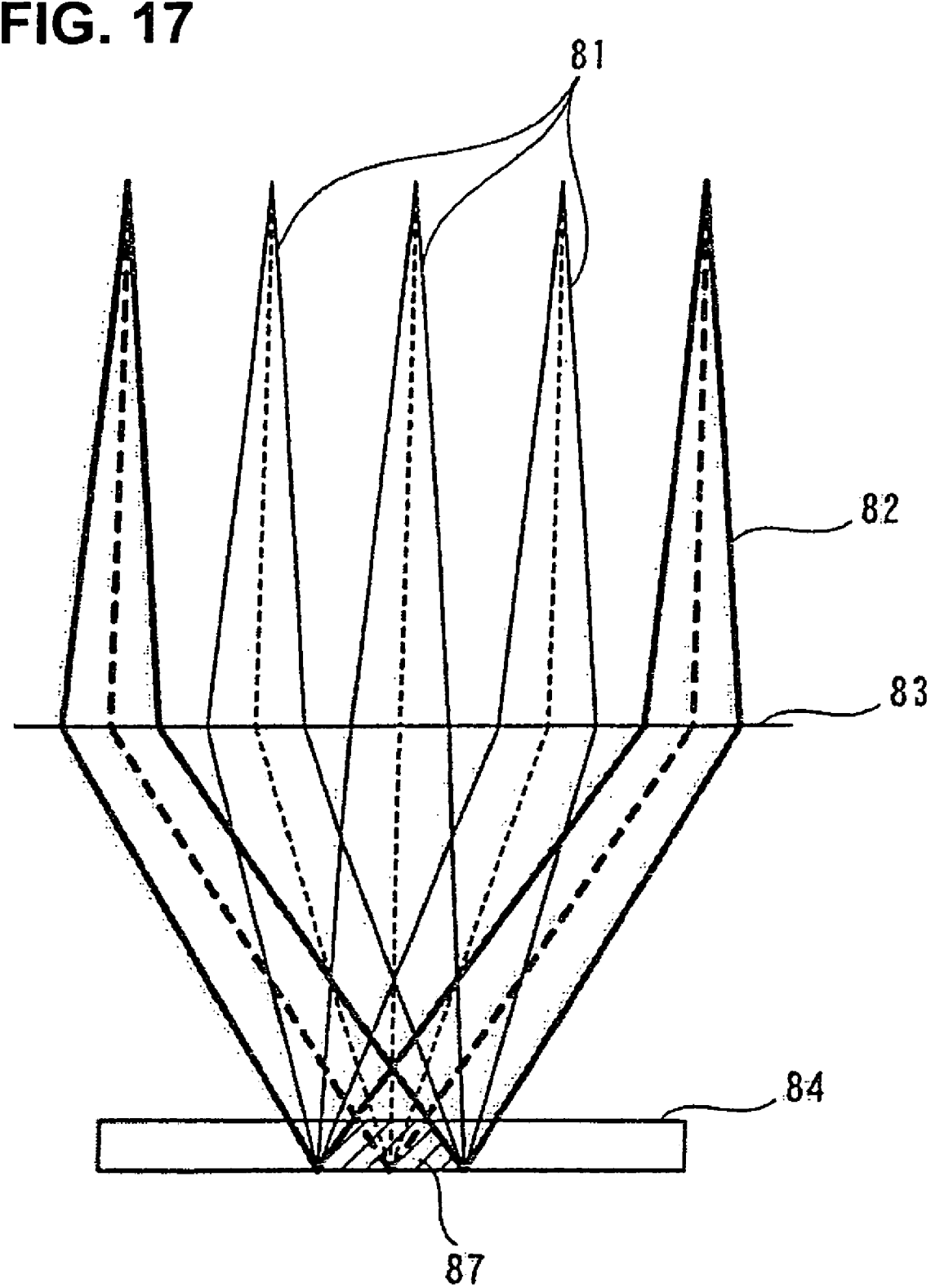
FIG. 17 is a conceptual diagram showing the relationship between information light and recording reference light in a conventional device.
Figure 18:
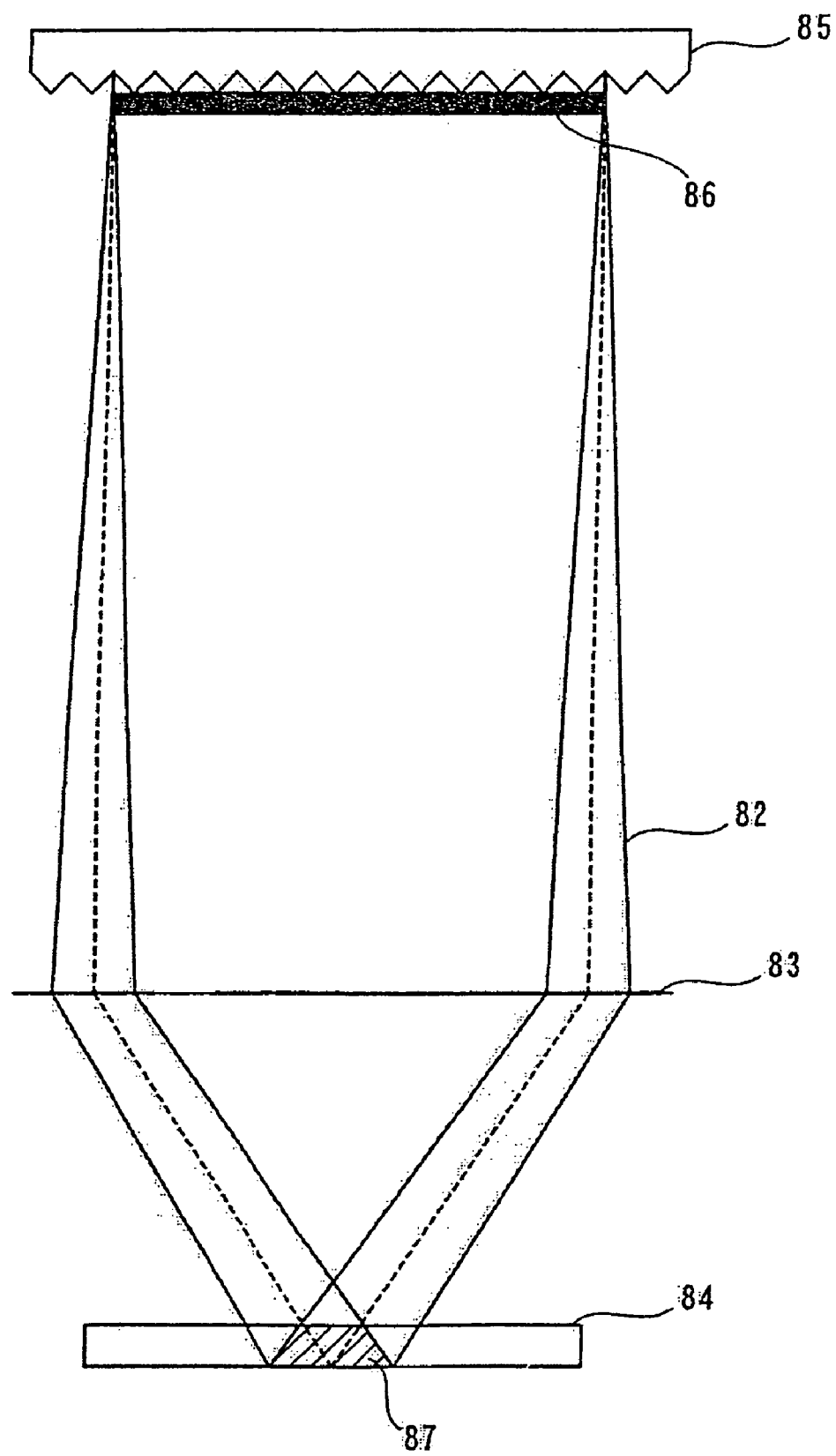
FIG. 18 is an overview showing a portion of the conventional recording reference light generation means.

Furthermore, the reference light is spatially modulated by the spatial light modulator 144 such that interference is not easily generated between reference lights in the information recording layer 3. As shown in the foregoing FIG. 17 and FIG. 18, the reference lights generated interfere between each other in the information recording layer 3 and generated noise because the reference light was wider than the predetermined area due to divergence.

Therefore, if the reference light is modulated such that interference between reference lights is not easily generated in the information recording layer 3, when spatially modulating, noise can be decreased.

For example, in FIG. 3, noise can be reduced by spatially modulating the intensity or the phase of the reference light into a plurality of radial patterns Ra spreading radially from the information light pattern display area I in the reference light pattern display area R, the central area I being the information light pattern display area I and the area R, formed to surround area I, being the reference light pattern display area R.

Figure 7:
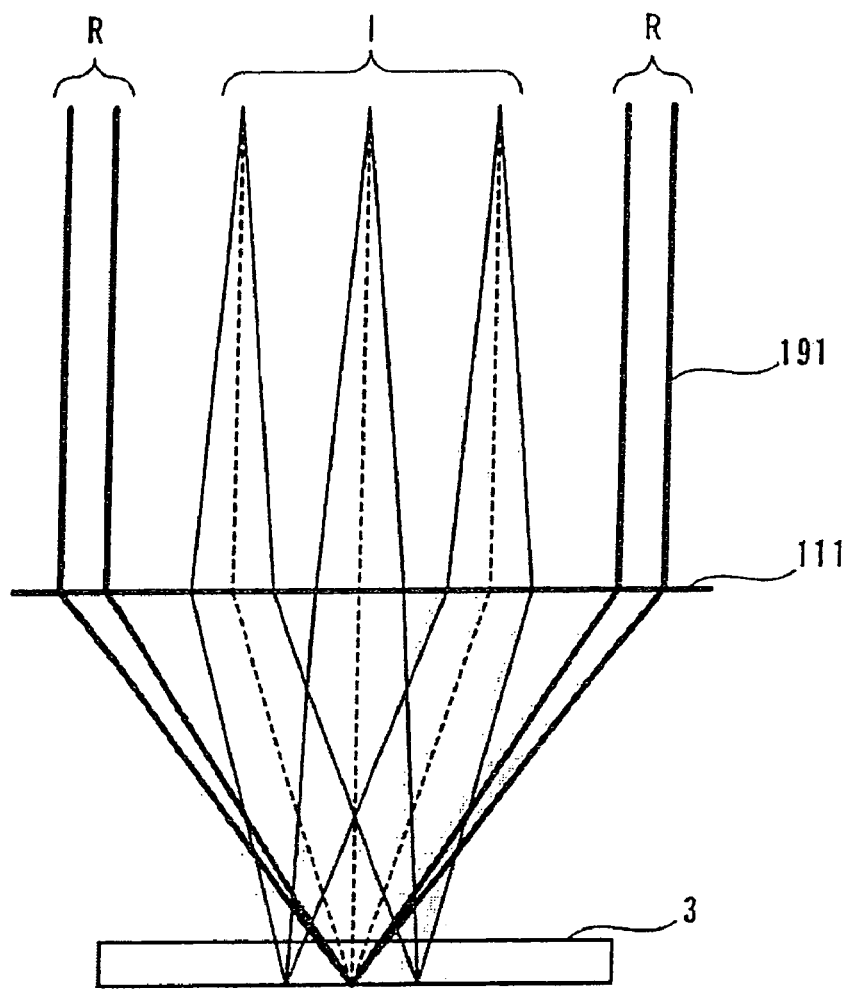
FIG. 7 is a conceptual diagram showing the relationship between information light and reference light of the present invention.

In the light head 140 shown in FIG. 1, reference light diverges because diffracted light, as well as the reference light, is generated when the spatial light modulator 144 spatially modulates the reference light because the spatial light modulator 144 which has pixels with small gaps forms a kind of diffraction grating. However, if the reference light is modulated into the radial pattern Ra in the spatial light modulator 144, divergence can be controlled because the pixel pitch becomes apparently larger since a plurality of pixels are successive in the same state, in the radial direction (the direction to the information light area I). As a result, the reference light 191 modulated into the radial pattern does not scatter in the radial direction (lateral direction in FIG. 7), as shown in FIG. 7, and interference between reference lights is not generated even if it is irradiated to the information recording layer 3 by the object lens 111.

Divergence is generated with the radial pattern Ra because it has small pixel gaps in the direction perpendicular to the radial direction (direction of the arrow in FIG. 3). However, even if the divergence in the direction perpendicular to the radial direction causes the reference lights to interfere with one another, this does not affect the information light area, and the SN ratio during reproduction is not reduced.

Figure 8A:
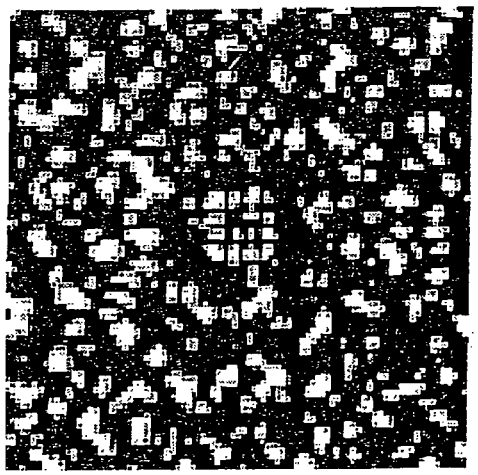
FIG. 8(A) is a top view showing a reproduced image using conventional holographic recording and (B) is a top view showing a reproduced image using holographic recording of the present invention.
Figure 8B:
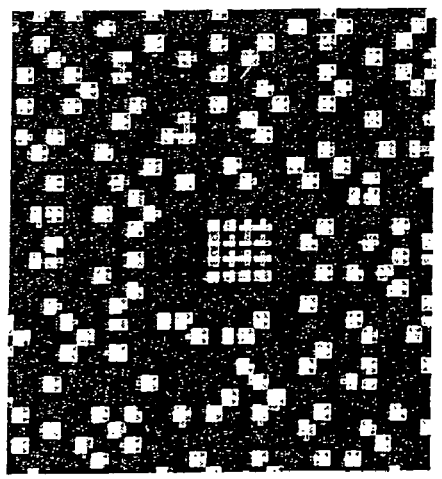

FIG. 8(B) is the reproduction of information which has been recorded using a reference light with a radial pattern. FIG. 8(B) is the reproduced image reproduced from the holography recorded using the information light spatially modulated by a plurality of pixels with a matrix structure and the reference light modulated into the radial pattern in the reference light area formed such as to surround the information light area. As shown FIG. 8(B), it can be confirmed from the reproduced image that the spatial modulation was performed by a plurality of pixels with a matrix structure, and it is also clear that information can be accurately reproduces by using a reference light with a radial pattern.

Divergence towards the information light area can be controlled, and noise reduced if the reference light is modulated into a plurality of radial patterns spreading radially from the information light area, in the reference light area formed such as to surround the information light area.

As the radial pattern Ra, the virtual center point at which the extension of each radial pattern converges can be one point, or radial patterns from multiple virtual center points can coexist. In addition, multiple radial patterns can be placed evenly spaced or can be unevenly spaced, as well. If the center of the information light area, the center of the reference light area which is formed such as to surround the information light area are optical axes, and the virtual center point of the radial pattern Ra is an optical axis, the direction along which the divergence is reduced by the radial pattern Ra becomes the information light area, further effectively eliminating noise.

Figure 9:
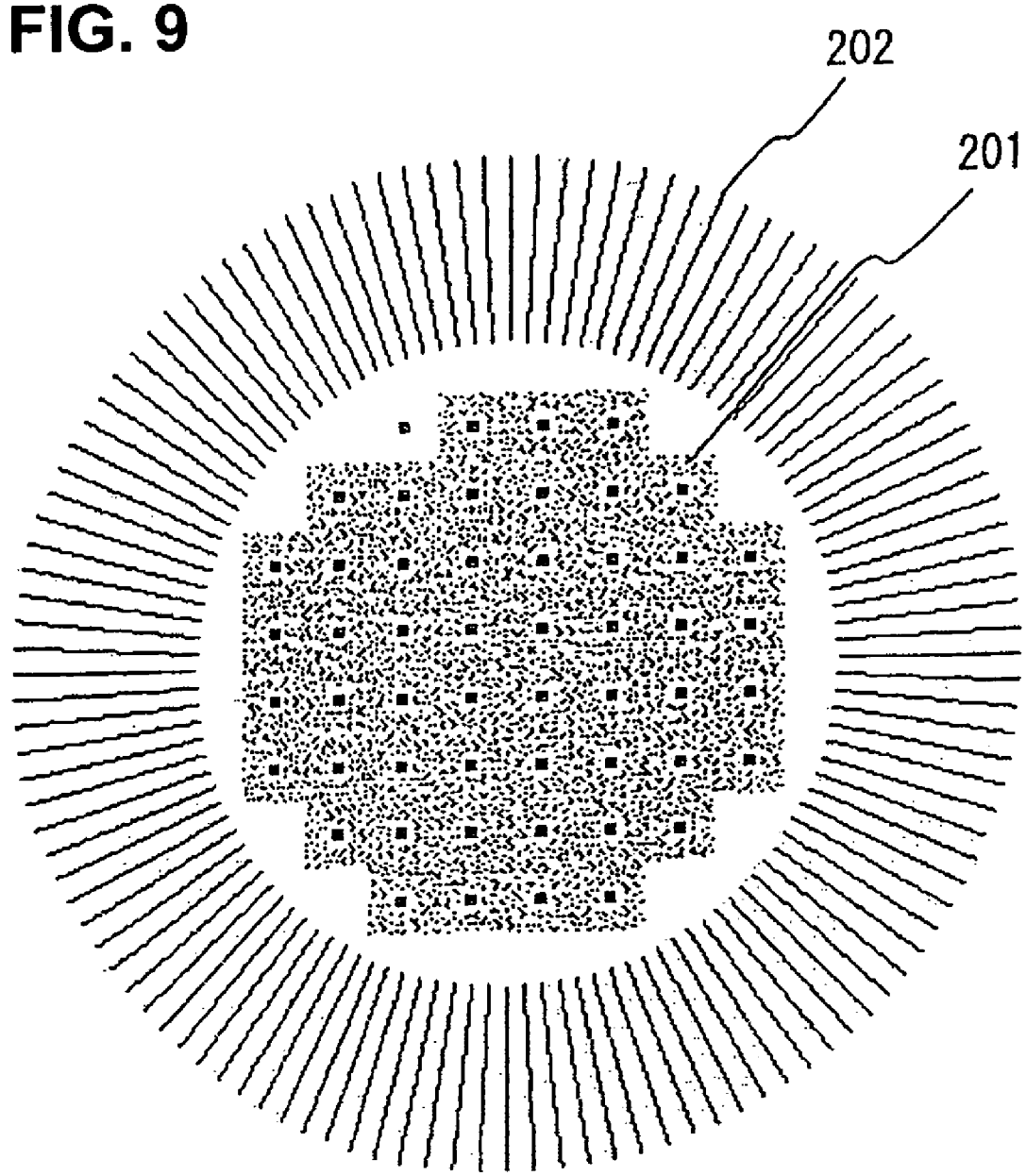
FIG. 9 is a diagram explaining the selectivity of reference light with a radial pattern.
Figure 10:
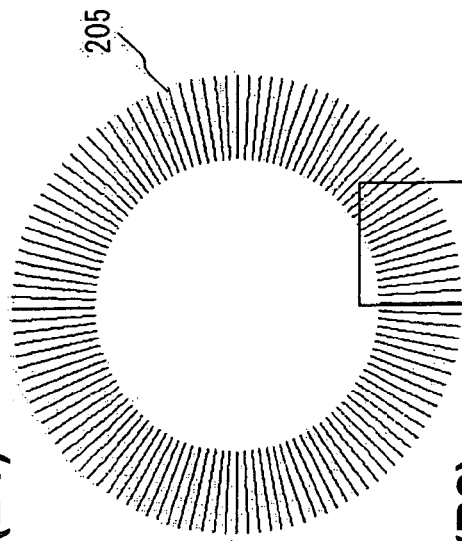
FIG. 10 is a diagram explaining the selectivity of reference light with a radial pattern.
Figure 10:
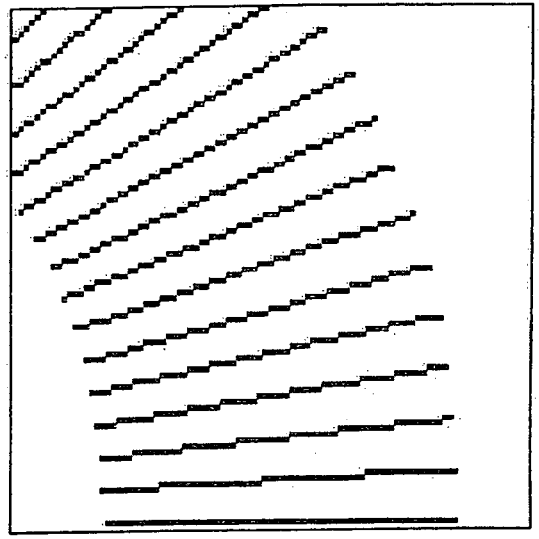
Figure 10:
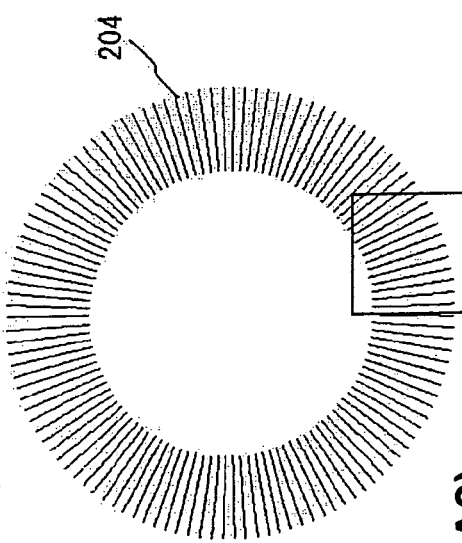
Figure 10:
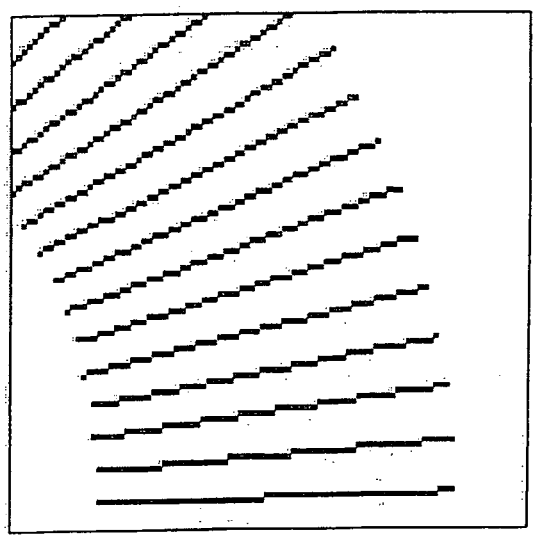

Furthermore, as shown in FIG. 9 to FIG. 11, if the radial pattern is used as the reference light, the selectivity of the reference light pattern for recorded information is enhanced, thus, becoming advantageous for multiplex recording and information encryption.

FIG. 9 shows a spatial modulation pattern 201 of the information light and a spatial modulation pattern 202 of the reference light, when recording. The spatial modulation pattern 201 of the information light comprises 54 quadrates of the same size, which are laterally aligned to form, sequentially from the bottom, 4 rows, 6 rows, 8 rows, 8 rows, 8 rows, 8 rows, 6 rows, and 4 rows. Each quadrate excluding that on the top-left has a small quadrate at its center, with the surrounding area filled with dots. The top-left quadrate does not have the surrounding dots in the other quadrates. The spatial modulation pattern 202 for the reference light is the radial pattern spreading radially from the virtual center, and two adjacent radial pattern lines intersect with each other at the virtual center point with an intersection angle (virtual center angle) of 3.00°.

FIG. 10 shows the spatial modulation patterns of the reproduction reference lights. The pattern 204 in FIG. 10(A1) is the same as the spatial modulation pattern 202 of the reference light at the time of recording. The enlarged square portion in the bottom-right corner of the pattern is shown in FIG. 10 (A2). The pattern 205 in FIG. 10(B1) is also a radial pattern which spreads radially from a virtual center point, and the virtual center angle at which two adjacent radial pattern lines intersect with each other is 3.02°. The enlarged square portion in the bottom-right corner of the pattern in FIG. 10(B2) is shown in FIG. 10(B2). It is not clear if the patterns differ, even when FIG. 10(A) and FIG. 10(B) are compared.

Figure 11B:
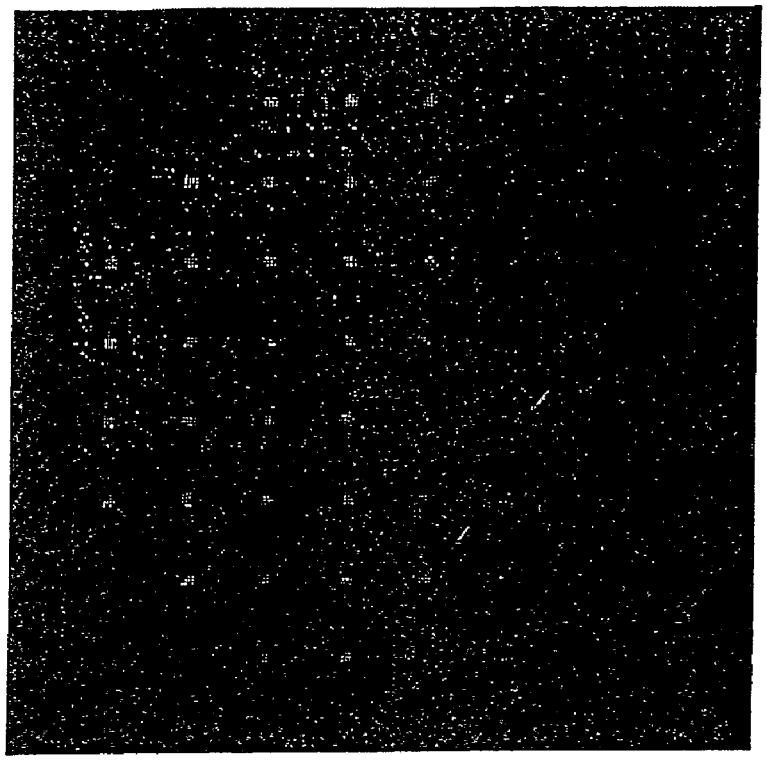
FIG. 11 is a diagram explaining the selectivity of reference light with a radial pattern.
Figure 11A:
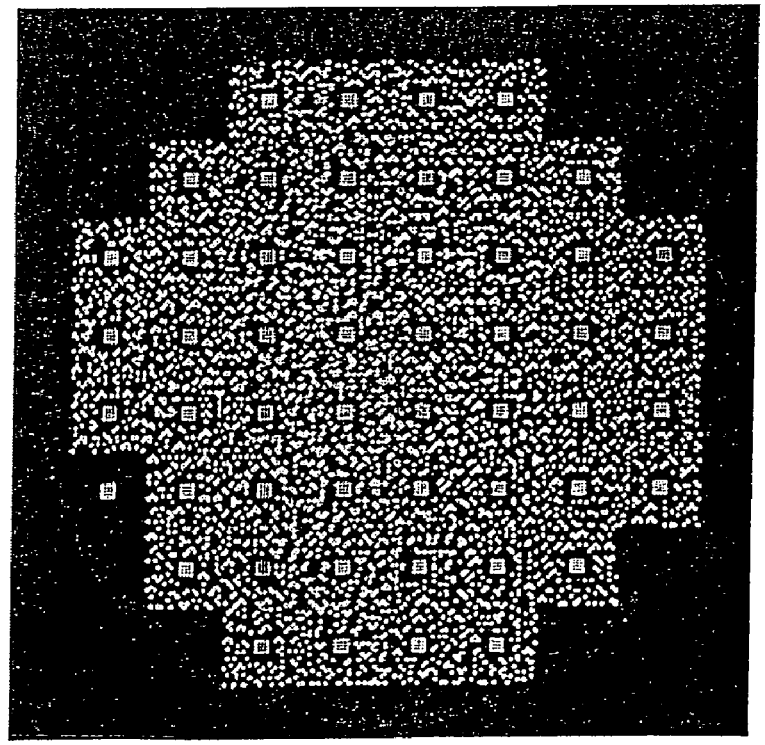

FIG. 11(A) is a reproduced image reproduced using the reference light of the spatial modulation pattern 204, and FIG. 11(B) is a reproduced image reproduced using the reference light of the spatial modulation pattern 205. It can be confirmed, from FIG. 11, that a mere difference of 0.02° between the virtual center angles of the radial patterns makes it almost impossible to reproduce information.

In addition, rotating the pattern 204 in FIG. 10(A) by a mere 0.02° with the virtual center point as the axis makes it almost impossible to reproduce information, as shown FIG. 11(B).

As described above, the reference light with a radial pattern preferable because there is little noise generated from other interference patterns recorded to overlapping areas when reproducing, when a plurality of reference lights are formed by changing the virtual central angle between a plurality of radial patterns or rotating the plurality of radial patterns and a plurality of interference patterns are multiplex-recorded in a plurality of areas wherein the information layers overlap.

In addition, by keeping the radial pattern of the reference light at the time of recording a secret, information security can be enhanced. Furthermore, information can be encrypted by recording information using iris patterns of the human eye as radial patterns.

In addition, to make the generation of interference difficult between the reference lights when the reference light is spatially modulated, the phase distribution of the reference light modulated by the spatial light modulator can have a cyclic pattern which deflects the traveling direction of the reference light in a direction other than the optical axis direction of the optical system.

The emission light can be deflected by giving the distribution of the phase to be modulated spatial cyclicity using a spatial light modulator capable of spatially modulating the phase. A spatial light modulator capable of varying the phases of emission lights according to the positions of the pixels, described in FIG. 2, can be used as this spatial light modulator.

Furthermore, interference between reference lights can be reduced when the reference light is irradiated to the recording medium, if the traveling direction of the reference light is deflected in a direction other than the optical axis direction. FIG. 12 and FIG. 13 are explanatory diagrams regarding when the traveling direction of the reference light is deflected in a direction other than the optical axis direction. FIG. 12(C) is the object aperture of the object lens 111 seen from the optical axis direction, and FIG. 12(A) and FIG. 12(B) are, respectively, a cross-sectional view of A-A' and a cross-sectional view of B-B' in the FIG. 12.

As shown in FIG. 12, the quadrant-shaped reference light 211 is irradiated onto the object lens 111 from the bottom right area 211a of the optical axis 212, but because its direction is deflected, the light travels by the object lens 111 such as to focus on a position 213 which differs from the optical axis 212 of the optical system, and is irradiated to the area 211b on the bottom of the information recording layer 214. Therefore, as shown in FIG. 13(b), the areas to which the reference lights are irradiated do not overlap and interference between reference lights can be prevented, even when a circular reference light is irradiated.

FIG. 13(a) to FIG. 13(e) respectively show a circular reference light divided, sequentially, into 3, 4, 6, 8, and 12 areas, and each shows the area irradiated by the reference light within the information recording layer in the bottommost row, when the traveling direction is other than that of the optical axis direction, as irradiated by the object lens in the direction indicated by the arrow in the topmost row. Interference between reference lights can be reduced by deflecting the traveling direction of the reference light in the direction other than the optical axis direction in this way.

Furthermore, because the reference light of which the traveling direction faces a direction other than the optical axis direction travels in the direction heading away from the optical axis, noise due to detection of reference light when reproducing can be reduced and the SN ratio can be improved. The ring mask 150 can be omitted, as well.

In addition, to make the generation of interference difficult between the reference lights in the information recording layer 3 when the reference light is spatially modulated, the reference light area on the entrance pupil surface of the object lens can be formed asymmetrical to the virtual center point of the reference light area.

Figure 14A:
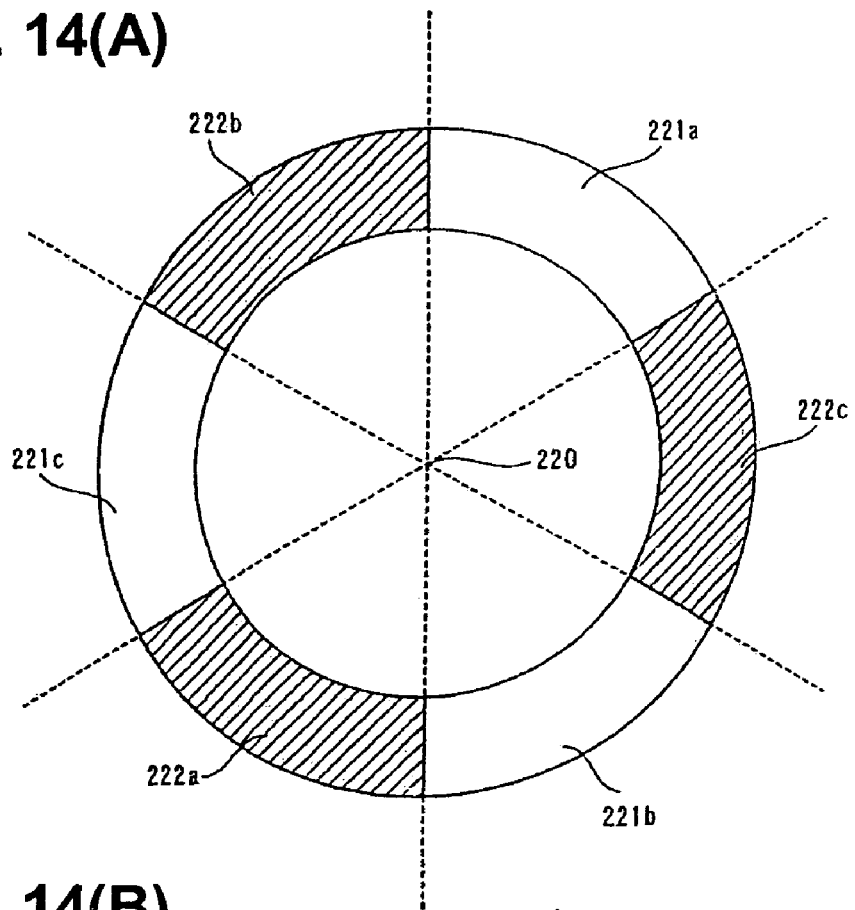
FIGS. 14(A) and (B) are top views showing the reference light area.
Figure 14B:
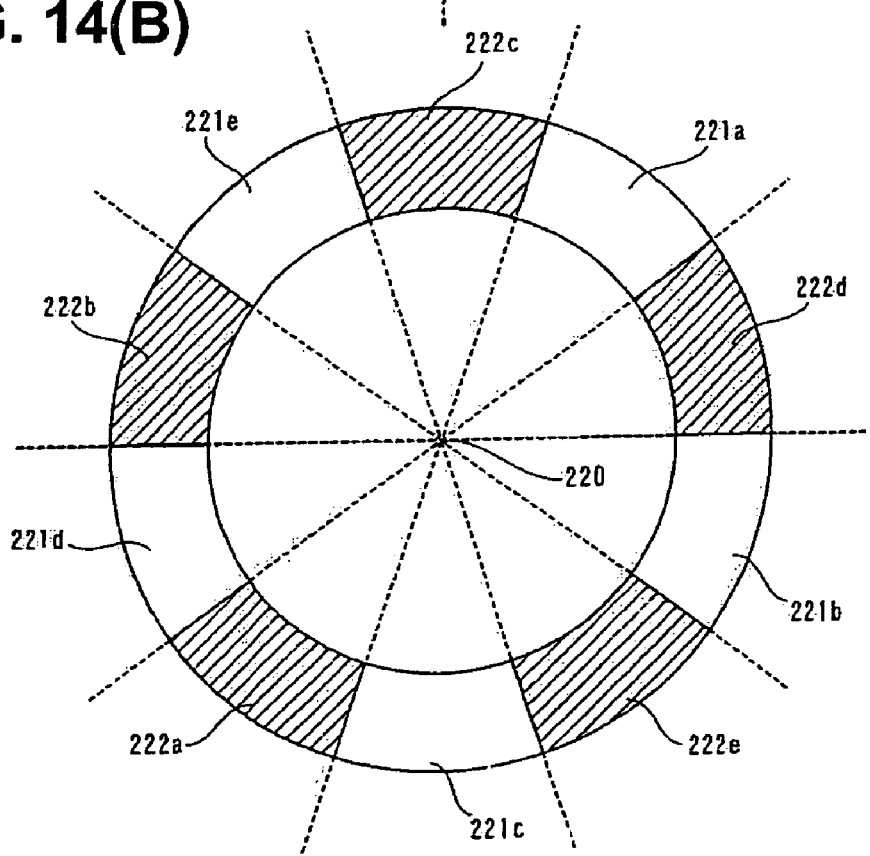

FIG. 14(A) and FIG. 14(B) are diagrams showing the reference light area 221 on the entrance pupil surface of the object lens. In FIG. 14(A) and FIG. 14(B), the reference light area 221 is formed asymmetrical to the virtual center point 220. Although, conventionally, interference was generated between the reference lights irradiated to symmetrical areas (refer to FIG. 17 and FIG. 18), because, in FIG. 14(A) and FIG. 14(B), the areas 222*a, b, c, d*, and *e* which are symmetrical to the reference light areas 221*a, b, c, d*, and *e*, respectively, do not form reference lights, interference between the reference lights can be prevented. Although a circular ring-shaped reference light area is explained in FIG. 14, the shape is not limited thereto. Furthermore, the reference light area comprises 3 and 5 smaller areas, in FIG. 14(A) and FIG. 14(B), and the areas can be asymmetrical if the number of areas is odd. However, if the number of reference light areas is one, the reference light is localized and, thus, not preferable.

In addition, as shown in FIG. 4, FIG. 5, FIG. 6, and FIG. 15, noise during reproduction can be reduced by spatially modulating the intensity of the reference light in the reference light area formed such as to surround the information light area. The modulation pattern of the reference light can be a random pattern with no regularity.

Figure 15A:
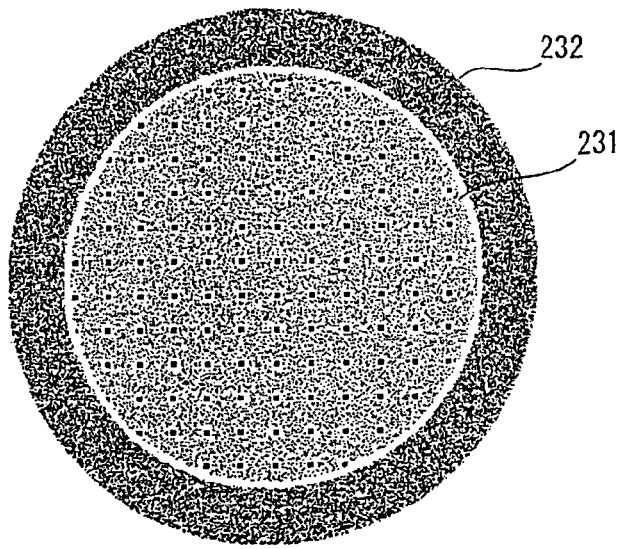
FIG. 15(A) is a top view showing the spatial modulation patterns of information light and reference light at the time of recording, (B) is a top view showing the spatial modulation pattern of reference light at the time of reproduction, and (C) is a top view showing a reproduced image.
Figure 15B:
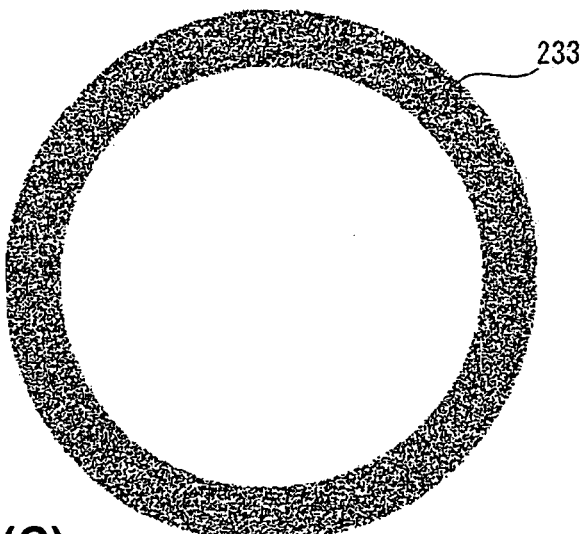
Figure 15C:
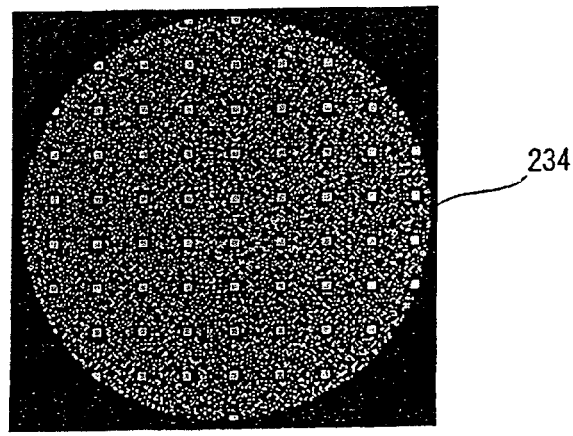
Figure 16:
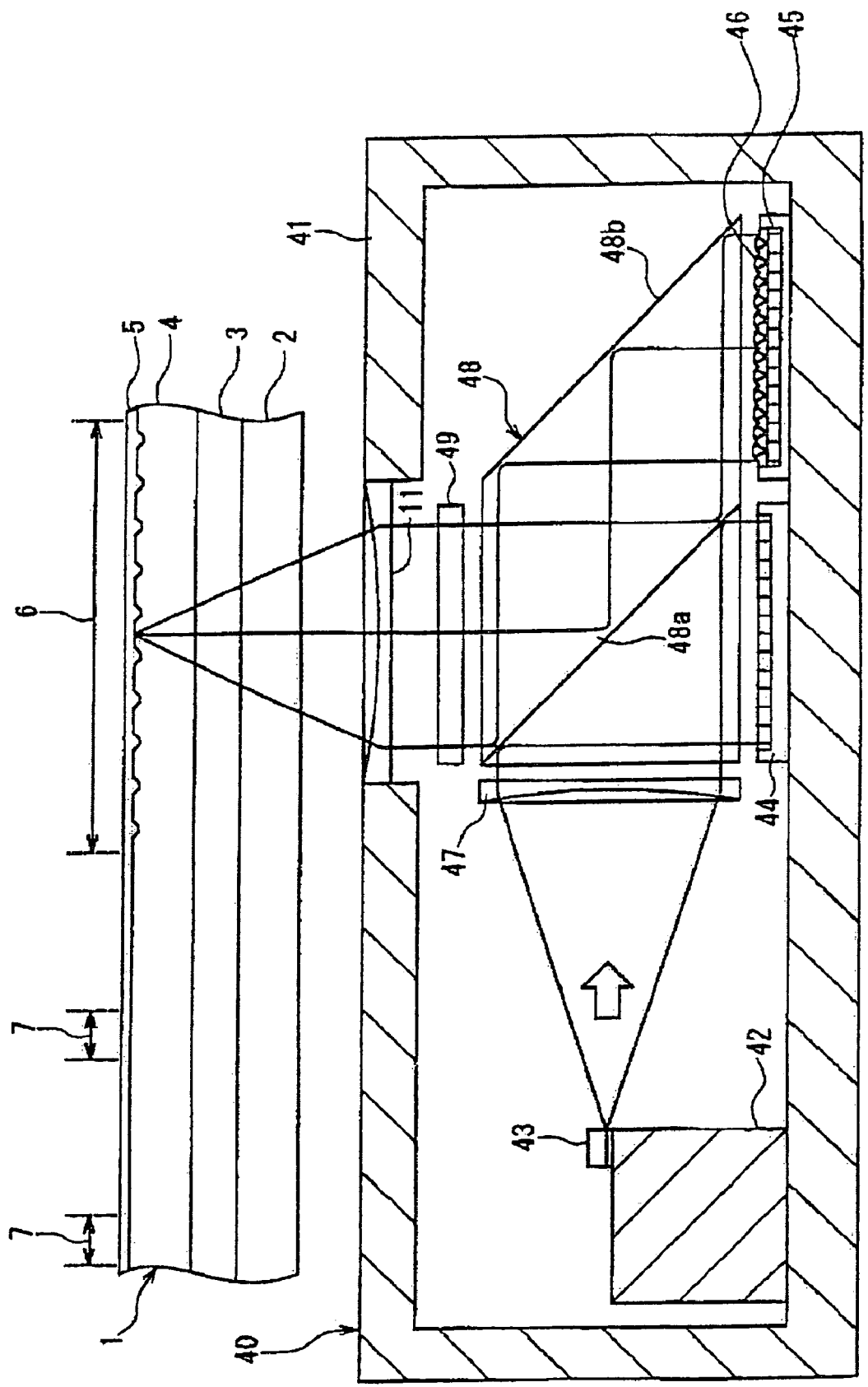
FIG. 16 is a cross-sectional view showing a conventional optical information recording/reproduction device.

FIG. 15(A) shows the modulation patterns of the information light and the reference light at the time of recording, FIG. 15(B) shows the modulation pattern of the reference light at the time of reproduction, and FIG. 15(C) shows the reproduced image at the time of reproduction. As shown in FIG. 15(A), information is recorded using the information light 231 of which the light intensity is spatially modulated in the circular information light area and the reference light 232 of which the light intensity is spatially-modulated in the circular ring-shaped information light area. The spatial modulation pattern of the reference light in FIG. 15(A) is a random pattern with no specific regularity.

Subsequently, the reproduced image 234, shown in FIG. 15(C), is obtained by irradiating the reproduction reference light 233 in FIG. 15(B) which has the same modulation pattern as the reference light 232, as shown in FIG. 15(B). The reproduced image 234 shown in FIG. 15(C) is spatially modulated to the same pattern as the information light 231 in FIG. 15(A), and it is confirmed that information is reproduced accurately.

The present invention is not limited to the foregoing embodiments, and various modifications can be made as required. For example, although the same optical path is shared when recording and when reproducing information in the foregoing embodiments, the present invention can be applied as such, even when separate paths are provided.

What is claimed is:

1. An optical information recording device which irradiates information light holding information and reference light onto a recording medium using an object lens, causes interference in the information recording layer of the recording medium, and records information using the resultant interference patterns, comprising:
    a first spatial light modulator for generating said information light by spatially modulating light from a light source by a plurality of pixels and
    a second spatial light modulator for generating the reference light by spatially modulating light from the light source by a plurality of pixels; wherein
    an area of said reference light on an entrance pupil surface of said object lens is formed such as to surround the area of said information light, and
    said reference light is spatially modulated into a plurality of radial line patterns extending radially out from the area of said information light, in the area of said reference light, by said second spatial light modulator.

2. The optical information recording device according to claim 1, wherein said first spatial light modulator and said second spatial light modulator comprise a first display area and a second display area of a shared spatial light modulator, respectively.

3. The optical information recording device according to claim 2, wherein said spatial light modulator comprises a plurality of pixels which can modulate the intensity of light, and the phases of emission lights vary according to the positions of a plurality of said pixels.

4. The optical information recording device according to claim 3, wherein the phase distribution of said reference light has a cycle pattern.

5. The optical information recording device according to claim 1, comprising:
    a servo light source which differs from the light source for recording information to said recording medium; and
    a servo information acquisition means for obtaining address servo information recorded to said recording medium by the light from said servo light source.

6. The optical information reproduction device according to claim 1, wherein said reference light is further spatially modulated by said second spatial modulator such that said area of said reference light on the entrance pupil surface of said objective lens is formed asymmetrical to a virtual center point of said reference light area.

7. The optical information reproduction device according to claim 1, wherein a traveling direction of said reference light is deflected in a direction other than an optical axis of said objective lens.

8. An optical information recording method which irradiates information light holding information and reference light onto a recording medium using an object lens, causes interference in the information on recording layer of the recording medium, and records information using the resultant interference patterns, wherein:
    both said information light and said reference light are spatially modulated by a plurality of pixels;
    an area of said reference light on an entrance pupil surface of said object lens is formed such as to surround the area of said information light; and
    said reference light is spatially modulated into a plurality of radial line patterns extending radially out from the area of said information light, in the area of said reference light.

9. The optical information recording method according to claim 8, wherein the center of the area of said information light, the center of the area of said reference light, and the virtual center point of said plurality of radial line patterns are the optical axes of the optical system.

10. The optical information recording method according to claim 8, wherein a plurality of reference lights with differing pattern-forms are formed by having different virtual center angles between a plurality of said radial line patterns or by rotating said plurality of radial line patterns with the virtual center point as a center of rotation, and multiplex recording of a plurality of interference patterns are performed in a plurality of superimposed areas within said information recording layer using said plurality of reference lights with differing patterns.

11. The optical information recording method according to any one of claims 8 to 10, wherein both said information light and said reference light are spatially modulated by the same spatial light modulator.

12. The optical information recording method according to claim 11, wherein the light intensity and phase of said reference light are spatially modulated by said spatial light modulator.

13. The optical information recording method according to claim 12, wherein the phase distribution of said reference light has a cyclic pattern.

14. An optical information reproduction device for reproducing the information from a recording medium having an information recording layer in which the information is recorded in the form of interference pattern, comprising:
   a light source,
   a spatial light modulator for generating a reference light by spatially modulating light from said light source by a plurality of pixels,
   an object lens for irradiating said reference light onto the interference pattern recorded on the information recording layer of the recording medium and passing through a return light from the recording medium including a reproduction light generated by interference of said reference light and the interference pattern, and
   an optical detector for detecting said reproduction light; wherein
   an area of said reference light on an entrance pupil surface of said object lens regarding said reference light is formed such as to surround the area of said reproduction light on this entrance pupil surface, and
   said reference light is spatially modulated into a plurality of radial line patterns extending radially out from the area of said reproduction light in the area of said reference light by said spatial light modulator.

15. The optical information reproduction device according to claim 14, wherein said spatial light modulator comprises a plurality of pixels which can modulate the intensities of lights, and the phases of emission lights vary according to the positions of a plurality of said pixels.

16. The optical information reproduction device according to claim 15, wherein the phase distribution of said reference light has a cyclic pattern.

17. The optical information reproduction device according to claim 14, comprising:
   a servo light source which differs from the light source for recording information to said recording medium; and
   a servo information acquisition means for obtaining address servo information recorded to said recording medium by the light from said servo light source.

18. An optical information reproduction method for reproducing the information from a recording medium having an information recording layer in which the information is recorded in the form of interference pattern, wherein:
   generating a reference light by spatially modulating light from a light source by a plurality of pixels,
   irradiating said reference light onto the interference pattern recorded on the information recording layer of the recording medium by an object lens,
   passing through a return light from the recording medium including a reproduction light generated by interference of said reference light and the interference pattern into said, object lens, and
   detecting said reproduction light by an optical detector;
   an area of said reference light on an entrance pupil surface of said object lens regarding said reference light is formed such as to surround the area of said reproduction light on this entrance pupil surface; and
   said reference light is spatially modulated into a plurality of radial line patterns extending radially out from the area of said reproduction light in the area of said reference light.

19. The optical information reproduction method according to claim 18, wherein the center of the area of said reference light and the virtual center point of said plurality of radial line patterns are optical axes of the optical system.

20. The optical information reproduction method according to any one of claims 18 to 19, wherein the light intensity and phase of said reference light are spatially modulated by a spatial light modulator.

21. The optical information reproduction method according to claim 20, wherein the phase distribution of said reference light has a cyclic pattern.

22. An optical information reproduction device for reproducing the information from a recoding medium having an information recording layer in which the information is recorded in the form of interference pattern, comprising:
   a light source,
   a spatial light modulator for generating a reference light by spatially modulating light from said light source by a plurality of pixels,
   an object lens for irradiating said reference light onto the interference pattern recorded on the information recording layer of the recording medium and passing through a return light from the recording medium including a reproduction light generated by interference of said reference light and the interference pattern, and
   an optical detector for detecting said reproduction light; wherein
   an area of said reference light on an entrance pupil surface of said object lens regarding said reference light is formed such as to surround the area of said reproduction light on this entrance pupil surface, and
   said spatial light modulator comprises a first spatial light modulator for generating the information light and a second spatial light modulator for generating a reference light such that an area of the reference light at the entrance pupil of the object lens is formed to surround the area of the information light and the reference light is spatially modulated into a plurality of discrete radial patterns that are asymmetric to a virtual center point of the reference light area.

* * * * *